(12) United States Patent
Jenne et al.

(10) Patent No.: US 8,413,962 B2
(45) Date of Patent: Apr. 9, 2013

(54) DEVICE AND METHOD FOR MOVING A WORKING MEANS IN THE GROUND

(76) Inventors: Dietmar Jenne, Brittnau (CH); Manfred Neumann, Walterswil (CH)

( * ) Notice: Subject to any disclaimer, the term of this patent is extended or adjusted under 35 U.S.C. 154(b) by 328 days.

(21) Appl. No.: 12/850,181

(22) Filed: Aug. 4, 2010

(65) Prior Publication Data

US 2011/0044762 A1      Feb. 24, 2011

(30) Foreign Application Priority Data

Aug. 19, 2009   (DE) .......................... 10 2009 038 058

(51) Int. Cl.
*B25B 33/00*      (2006.01)

(52) U.S. Cl.
USPC ............................. 254/108; 254/100; 254/103

(58) Field of Classification Search .......... 254/108–111, 254/100, 103, 106, 134, 29 R; 405/174–175, 405/177, 183.5, 184, 184.1, 184.3
See application file for complete search history.

(56) References Cited

U.S. PATENT DOCUMENTS

| | | | | |
|---|---|---|---|---|
| 1,569,054 | A | * | 1/1926 | Warner ................. 254/134.3 FT |
| 2,056,489 | A | * | 10/1936 | Scott et al. .................. 254/29 R |
| 4,000,879 | A | * | 1/1977 | Martin et al. ................ 254/29 R |
| 4,299,375 | A | * | 11/1981 | Schosek ....................... 254/29 R |
| 2006/0034666 | A1 | * | 2/2006 | Wentworth et al. ........... 405/184 |
| 2006/0193697 | A1 | * | 8/2006 | Wentworth et al. ........... 405/184 |
| 2007/0071558 | A1 | * | 3/2007 | Wentworth et al. ........... 405/184 |
| 2007/0245516 | A1 | * | 10/2007 | Wentworth et al. ............... 16/44 |

FOREIGN PATENT DOCUMENTS

| | | |
|---|---|---|
| DE | 19608980 A1 | 9/1997 |
| DE | 10332328 B3 | 5/2005 |
| EP | 0794315 A1 | 9/1997 |
| GB | 2403994 * | 1/2005 |

\* cited by examiner

*Primary Examiner* — Basil Katcheves
*Assistant Examiner* — Beth Stephan
(74) *Attorney, Agent, or Firm* — McCormick, Paulding & Huber LLP

(57) ABSTRACT

In a method and a device for moving a working means in the ground, a coupling means rotatable about an axis of rotation for establishing a drive connection between a push-pull unit and a rod assembly having at least one projection and/or at least one recess is engaged with the projection and/or the recess of the rod assembly such that via a first contact area of the coupling means a first feed force is transmitted from the push-pull unit to the rod assembly. By the counter force opposite to the first feed force a torque acting on the coupling means is generated, which torque presses a second contact area of the coupling means against the rod assembly with a contact force. By the contact force, a non-positive connection is established between the push-pull unit and the rod assembly. Via this non-positive connection, a second feed force is transmitted to the rod assembly. By at least a part of the first and second feed force acting on the rod assembly a linear movement of the rod assembly is caused.

19 Claims, 19 Drawing Sheets

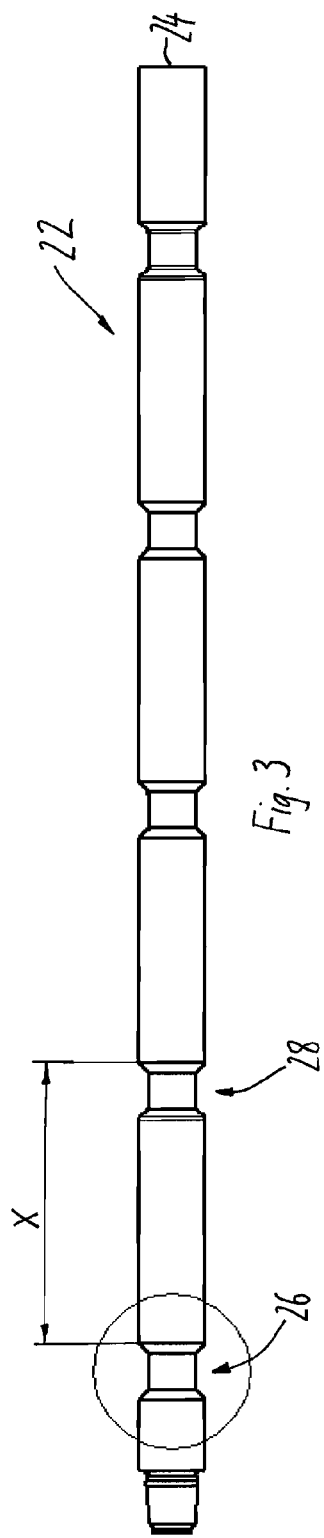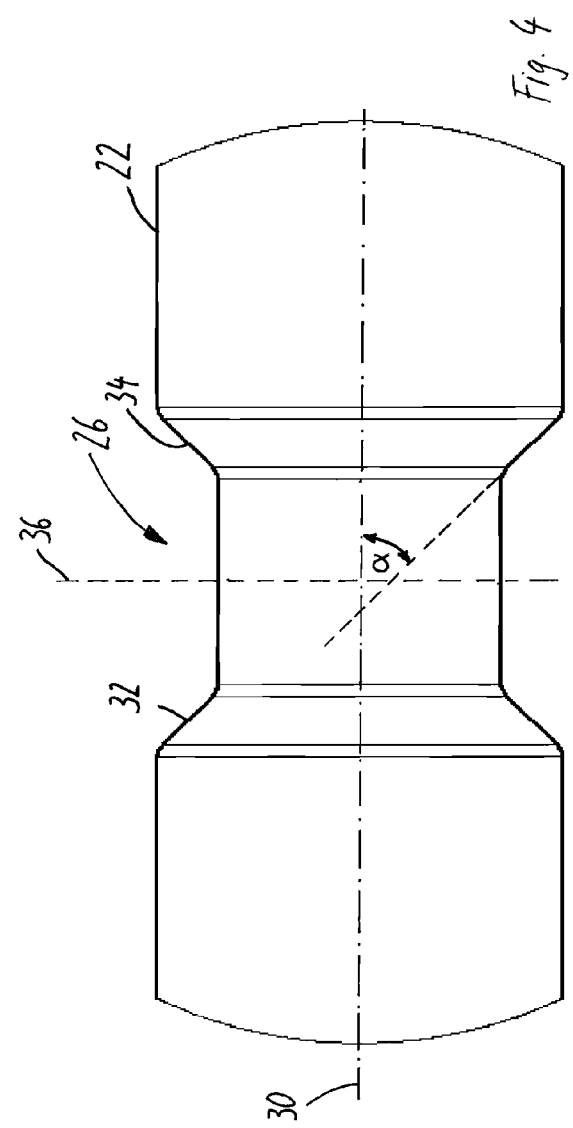

DEVICE AND METHOD FOR MOVING A WORKING MEANS IN THE GROUND

CROSS REFERENCE TO RELATED APPLICATIONS

This application claims the priority of German patent application no. 10 2009 038058.2, which was filed on Aug. 19, 2009 and of which the entire disclosure is hereby included by reference.

BACKGROUND OF THE INVENTION

The invention relates to a device for moving a working means in the ground, comprising a push-pull unit for generating a linear movement of a working means connected to the push-pull unit via a rod assembly. A device of this type can, for example, be used for replacing supply pipes which are laid underground. For this purpose, a tool destroying the old pipe and/or an expansion head is connected as a working means to the end of the rod assembly remote from the device. This working means is pulled into the ground together with a new pipe section upon retraction of the rod assembly. Such an arrangement and a device suitable for driving the rod assembly are, for example, known from the document DE 103 32 328 B3. This known device comprises an automatic clamping device with two clamping jaws for establishing a working connection between the push-pull unit and the rod assembly. The clamping jaws are each mounted so as to be pivotable about a journal. The rod assembly can be clamped between the clamping jaws upon a driving motion of the push-pull unit. In this process, the automatic clamping device clamps the rod assembly in one working direction. The clamping device is formed such that, for changing the working direction, it is reversible and thus selectively causes a feed or a retraction of the rod assembly. In the direction of motion opposite to the working direction, the clamping device is movable freely relative to the rod assembly.

With the aid of the clamping device a mere non-positive connection is established between the clamping device and the rod assembly. In particular, if the rod assembly and/or the clamping jaws get dirty when used on a construction site, the contact force of the clamping jaws on the rod assembly upon clamping of the rod assembly might be reduced so that a slipping of the rod assembly through the clamping jaws in the clamped state cannot be reliably prevented.

From the document DE 196 08 980 C2, a device for drilling in the ground is known, in which a coupling is provided between a push-pull unit and a rod assembly via coupling means which engage in a form-fitting manner with projections or into recesses of the rod assembly. Here, it is provided that a ratchet which is used as a coupling means engages behind a projection or in a recess. As a result thereof, the entire feed force to be introduced into the rod assembly is introduced via the form-fitting coupling means. For this, both the ratchet and a pivot pin for the pivotal arrangement of the ratchet as well as the recesses or, respectively, the projections have to be dimensioned relatively large so that the coupling means can introduce the required feed force into the rod assembly. In particular under construction site conditions, the coupling means as well as the projections or, respectively, recesses can get dirty, which reduces the engagement areas for the engagement of the coupling means. Thus, there is a risk that no reliable form-fitting connection can be established between the coupling means and the rod assembly. In particular, the coupling means can slip out of a dirty area of engagement formed by the projection or the recess in the rod assembly. In particular, it is possible that high mechanical stresses occur due to the small transmission surface and, as a result thereof, damages to the rod assembly and/or the coupling means can be caused. Further, for a form-fitting coupling relatively large projections or recesses must be provided, as a result whereof a relatively large total cross-section of the rod assembly is necessary. The total push and pull forces exerted on the rod assembly have to be transmitted by the rod assembly cross-section remaining in the area of the recesses or, respectively, by the rod assembly cross-section outside of the projections.

In the devices known from the documents DE 103 32 328 B3 and DE 196 08 980 C2 rod assemblies can be used which are assembled from individual rod members or are formed as a link chain. Further, the known devices can be arranged in pits which are placed in the ground. With the aid of the device the rod assembly can then be pushed into a supply pipe, which is preferably to be renewed and which ends in the pit, until an end region of the rod assembly projects from the supply pipe at the other end thereof. A working means and preferably a supply pipe to be pulled in can then be connected to this end. With the aid of the device, then the rod assembly together with the working means and the new supply pipe to be pulled in is pulled through the old supply pipe. In doing so, the old supply pipe is preferably destroyed, the area around the old supply pipe is expanded and the new supply pipe is pulled into the expanded area.

SUMMARY OF THE INVENTION

It is the object of the invention to specify a device and a method for moving a working means in the ground, in which a reliable coupling between a push-pull unit and a rod assembly is easily possible.

This object is solved by a device for moving a working means in the ground and a corresponding method.

The device has a push-pull unit for generating a linear movement of a rod assembly having at least one projection and/or at least one recess, at least one coupling means rotatable about an axis of rotation for establishing a drive connection between the push-pull unit and the rod assembly. The coupling means can be engaged with the projection and/or the recess of the rod assembly such that the coupling means transmits a first feed force from the push-pull unit to the rod assembly via a first contact area of the coupling means. The counterforce opposite to the first feed force generates a torque acting on the coupling means, which torque presses a second contact area of the coupling means with a contact force against the rod assembly. The coupling means thus establishes a non-positive connection between the push-pull unit and the rod assembly by the contact force and transmits a second feed force to the rod assembly via this non-positive connection, wherein at least a part of the first and second feed force acting on the rod assembly causes the linear movement of the rod assembly.

The method employs a coupling means rotatable about an axis of rotation for establishing a drive connection between a push-pull unit and a rod assembly having at least one projection and/or at least one recess. By engaging the coupling means with the projection and/or the recess of the rod assembly via a first contact area of the coupling means a first feed force is transmitted from the push-pull unit to the rod assembly. By a counterforce opposite to the first feed force a torque acting on the coupling means is generated, which torque presses a second contact area of the coupling means against the rod assembly with a contact force. By the contact force, a non-positive connection is established between the push-pull unit and the rod assembly. Via this non-positive connection, a second feed force is transmitted onto the rod assembly. By at least a part of the first and second feed force acting on the rod assembly a linear movement of the rod assembly is caused.

Advantageous developments of the invention are also described.

By the inventive device and the inventive method for moving a working means in the ground, it is achieved that a sufficiently high contact force for establishing a reliable non-positive connection between the push-pull unit and the rod assembly is generated even if the coupling means and/or the rod assembly are dirty in the coupling area. As a result thereof, in particular additional means for increasing the adhesion between the coupling means and the rod assembly, as they are common for mere non-positive connections in the prior art, can be dispensed with. In particular, the provision of specific surfaces having a relatively high roughness, for example by forming grooves and riffles, in the contact area between the coupling means and the rod assembly can be dispensed with. In particular by the torque acting on the coupling means a very high contact force of the coupling means can be exerted on the rod assembly. With the aid of the arrangement of the axis of rotation of the coupling means and of the second contact area, the force ratio between feed force and contact force can be set. In advantageous embodiments, this force ratio of feed force to contact force lies in the range from 1:2 to 1:8, preferably in the range from 1:3 to 1:4. Given a force ratio of 1:3, thus with a feed force of 10 t (98 100 N) a contact force of 30 t (294 300 N) is exerted. As a result thereof, it is easily possible to provide a coupling and a force transmission between the push-pull unit and the rod assembly which are safe and reliable even under construction site conditions. In particular, a slipping between the rod assembly and the coupling means is prevented by means of the inventive coupling without any additional measures being required.

In an advantageous development of the invention the push-pull unit is pressure-medium actuated and has at least one working cylinder and a piston with a piston rod. The piston rod or the working cylinder are connected to a coupling arrangement comprising the coupling means and move this coupling arrangement relative to a frame of the device. As a result thereof, an easy and robust drive for moving the rod assembly is possible, which drive is suitable for rough use on construction sites.

The working cylinder and the piston rod can have a channel for the passage of the rod assembly. Thus, the rod assembly can be passed through the cylinder, as a result whereof a space-saving arrangement is possible which enables a relatively small structural shape of the device and requires only relatively small pit dimensions when using the device in a pit to be placed in the ground.

The linear movement of the rod assembly creates a pulling motion and/or a pushing motion of a working means connected to an end region of the rod assembly. As a result thereof, the working means connected to the rod assembly can be both inserted into the ground by a pushing motion as well as pulled towards the device through the ground by a rod assembly already placed in the ground. In particular, the rod assembly can be passed through an existing pipe laid in the ground without a working means being connected to the end region of the rod assembly placed in the pipe. After the rod assembly has reached the opposite end of the pipe and preferably projects therefrom, the working means can be connected to the end region of the rod assembly. After a reversal of the drive direction, the working means connected to the end region of the rod assembly can be pulled towards the device by a pulling motion so that the working means is pulled through the pipe and/or through the ground surrounding the pipe.

It is particularly advantageous to form a coupling arrangement comprising the coupling means as an automatic coupling arrangement. The automatic coupling arrangement clamps the rod assembly with the aid of the at least one coupling means in one working direction of the push-pull unit and is movable freely relative to the rod assembly in the direction opposite to the working direction. As a result thereof, an automatic re-gripping given a back and forth movement of the coupling means or, respectively, of the coupling arrangement can take place without interventions of an operator being required for this. As a result thereof, the device can successively move the rod assembly automatically without further operator interventions. When placing a rod assembly comprising several rod assembly elements in the ground, an operator can continuously supply rod assembly elements to the device and connect these to a preceding rod assembly element, while the device automatically successively moves the rod assembly assembled from previously inserted rod assembly elements by a back and forth movement of the coupling arrangement. After a reversal of the working direction, i.e. upon a retraction of the rod assembly, the retraction can take place automatically successively by means of a back and forth movement of the coupling arrangement, wherein an operator can separate the retracted rod assembly elements from one another and can remove them from the device.

The reversal of the working direction of the coupling arrangement can be preset by a reversal of the coupling means, preferably by another arrangement of the coupling means, so that the coupling means of the coupling arrangement can be drivingly connected to the rod assembly in the preset working direction only. As a result thereof, an easy reversal of the working direction of the device is possible without it being necessary for the device to be turned around in a complex manner.

It is particularly advantageous if the rod assembly has several circumferential grooves or several circumferential projections. The distance between two adjacent grooves or, respectively, two adjacent projections is preferably smaller or equal to the length of a linear movement which can be generated by the push-pull unit in one working step. As a result thereof, the coupling means can be engaged with a further recess or, respectively, a further projection for a movement of the rod assembly to be performed in the next working step. By such an arrangement of the projections and/or circumferential grooves, an engagement of the coupling means, in particular given a rotationally symmetric rod assembly, is possible independent of the angular position of the rod assembly about its longitudinal axis, or given a triangular or polygonal rod assembly an angular offset by respective angles of rotation is possible without this requiring an adaptation of the coupling means.

It is particularly advantageous to arrange the flank of the projection or of the recess, with which the coupling means engages via the first contact area, perpendicularly to the longitudinal axis of the rod assembly or in an acute angle to the longitudinal axis of the rod assembly. As a result thereof, in particular an undercut arrangement is avoided in which the coupling means could get caught. If an acute angle is provided, the coupling means can slide over the inclined flank after a reversal of the working direction upon retraction of the coupling arrangement, as a result whereof wear, in particular on the coupling means, is avoided during retraction.

It is particularly advantageous if the recess and/or the projection have a second flank opposite to the first flank, the flanks being arranged mirror-symmetrically to a plane through which the longitudinal axis of the rod assembly extends orthogonally. As a result thereof, in particular given a reversal of the working direction, the same flank can be provided for engagement with the coupling means, as a result whereof an easy reversal of the working direction is possible.

A straight line extending on the surface of the flank intersects the longitudinal axis of the rod assembly in an angle of intersection having a value in the range between 25° and 65°, preferably in the range between 30° and 60°, in particular a value of 45°. Here, the angle of intersection is the smaller angle between two intersecting straight lines.

The engagement area of the coupling means, which area comprises the first contact area, is formed complementarily to the flank of the recess during transmission of the first feed force. As a result thereof, a surface contact is established between the first contact area and the flank of the projection or, respectively, the flank of the recess upon engagement. The first feed force can be transmitted via a relatively large surface, preferably the entire surface, from the coupling means to the rod assembly.

Alternatively, the engagement area of the coupling means and the flank of the recess or, respectively, the flank of the projection do not run parallel. As a result thereof, the force is transmitted via a contact line forming the contact area. By the transmission of the first feed force via a contact line or, respectively, a very little contact area, high adhesive forces are created between the contact area and the flank and a reliable holding of the coupling means on the flank is achieved. In doing so, a straight line extending on the surface of the flank can intersect the longitudinal axis of the rod assembly in a first angle of intersection. A straight line extending on the surface of the engagement area intersects the longitudinal axis of the rod assembly during transmission of the first feed force in a second angle of intersection. The first angle of intersection is greater or smaller than the second angle of intersection. As a result thereof, a contact area can easily be created which, in the ideal case, is linear. Preferably, the angles of intersection have a difference in the range between 1° and 20°, in particular of 5°.

The angles of intersection are preferably arranged in a plane which includes the longitudinal axis of the rod assembly and whose normal vector runs parallel to the axis of rotation of the coupling means. It is particularly advantageous to provide at least two coupling means, each of which is rotatable about an axis of rotation, for establishing the drive connection between the push-pull unit and the rod assembly, which coupling means are preferably arranged on opposite sides of the rod assembly. The coupling means can then engage on opposite sides with the projection or, respectively, with one projection and/or one recess or, respectively with one recess of the rod assembly each such that the respective coupling means transmits, via a first contact area of the respective coupling means, each time a first feed force of the push-pull unit to the rod assembly. As a result thereof, the rod assembly can easily be clamped between the coupling means. Further, more than two coupling means can be provided, in particular three or four coupling means which are arranged radially about the rod assembly, preferably at the same angular distance from each other. The coupling means engage with the same projection and/or the same recess. Alternatively, the coupling means can engage with one projection each and/or with one recess each.

Further it is advantageous in the inventive device and the inventive method when the contact force with which the second contact area is pressed against the rod assembly is greater than the weight of the coupling means. Thus it is possible to actually establish a non-positive connection between the coupling means and the rod assembly and to keep the size of the coupling means relatively small.

BRIEF DESCRIPTION OF THE DRAWINGS

Further features and advantages of the invention result from the following description which in connection with the enclosed Figures explains the invention in more detail with reference to embodiments.

FIG. 3 shows a top view of the rod assembly element according to FIG. 2.

FIG. 4 shows an enlarged illustration of a detail A according to FIG. 3.

DESCRIPTION OF THE PREFERRED EMBODIMENTS

Figure 1:
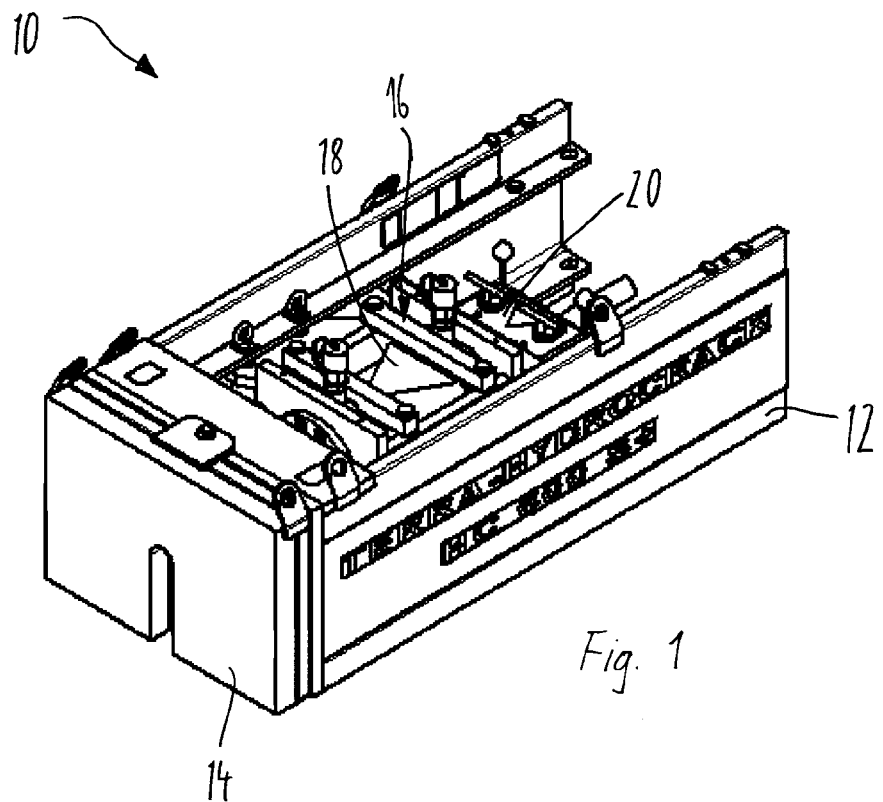
FIG. 1 shows a first perspective illustration of an inventive device for moving a working means in the ground.

In FIG. 1, a device 10 for moving a non-illustrated working means in the ground is illustrated. The device comprises a frame, generally identified with the reference sign 12, for receiving elements of the device 10 as well as a front panel 14 for supporting the device 10 against the soil during operation of the device 10. The push-pull unit, generally identified with the reference numeral 16, comprises a working cylinder 18. Further, the device 10 comprises a coupling arrangement 20 which is connected to the free end of a piston rod of the working cylinder 18.

The coupling arrangement 20 is driven by the working cylinder 18 in a manner known per se, wherein an alternating back and forth movement of the coupling arrangement 20 can be created with the aid of the working cylinder.

Figure 2:
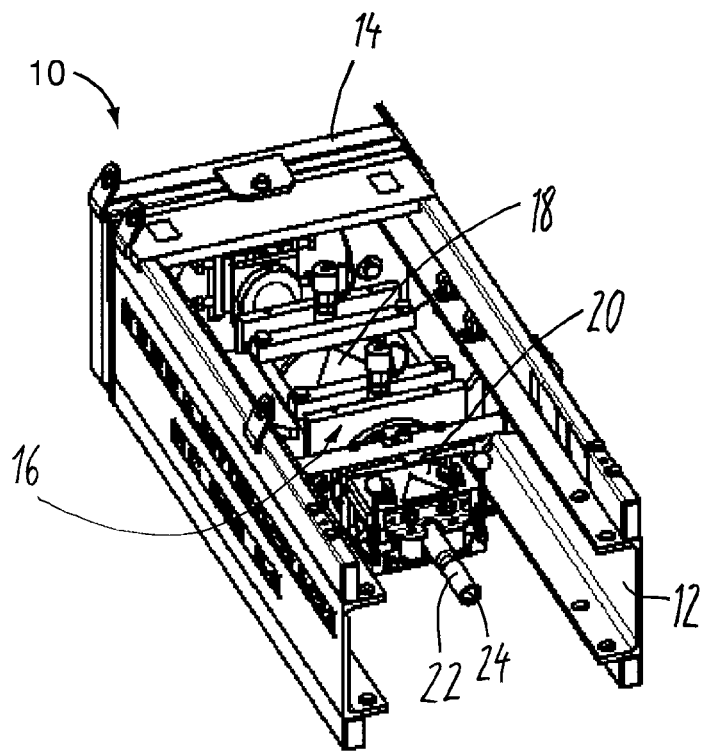
FIG. 2 shows a second perspective illustration of the device according to FIG. 1 with a rod assembly element.

In FIG. 2, a further perspective illustration of the device 10 according to FIG. 1 is shown. Identical elements have identical reference signs. In FIG. 2, a rod assembly element 22 is additionally illustrated which is passed through the working cylinder 18 through an opening in the piston rod thereof so that further rod assembly elements are combined with the rod assembly element 22 illustrated in FIG. 2 to form a rod assembly. Here, one of the further rod assembly elements can be connected to a contact area 24 of the rod assembly element 22 via a complementary contact area of this further rod assembly element. The contact areas can, for example, be formed as threads, bayonet couplings, ratchets or locks, or other suitable connecting means.

In FIG. 3, the rod assembly element 22 according to FIG. 2 is shown. In the present embodiment, the rod assembly element 22 has five circumferential recesses, two of which are identified with the reference signs 26 and 28. The adjacent recesses 26, 28 have a distance to one another that is referenced with X. The distance X is smaller than the stroke range of the piston rod of the working cylinder 18 of the device according to FIGS. 1 and 2 so that, after extension of the piston rod, the coupling arrangement can be engaged with another recess by a retraction of the piston rod and once again a drive connection can be established between the push-pull unit 16 and the rod assembly element 22.

In FIG. 4, the detail A according to FIG. 3 with the recess 26 is illustrated in an enlarged manner. The flanks 32, 34 of the recess 26 are designed as inclined surfaces and each have an angle of intersection a relative to the center axis 30 of the rod assembly element 22. In the present embodiment, the angle α is 45°. The flanks 32, 34 are arranged mirror-symmetrically with respect to the plane 36. The center axis 30 orthogonally intersects the plane 36.

Figure 5:
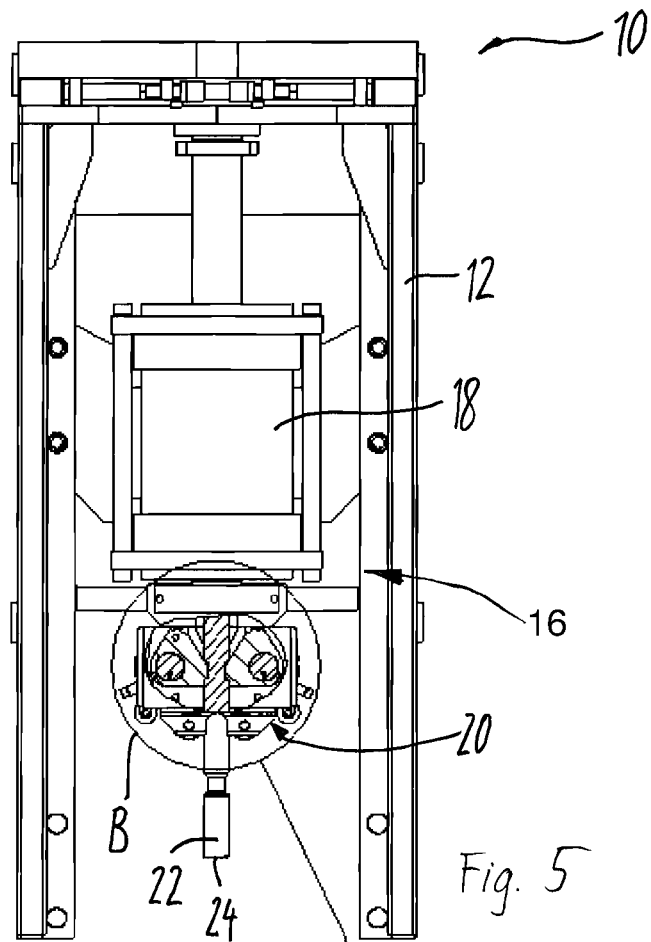
FIG. 5 shows a top view of the device according to FIGS. 1 and 2.

In FIG. 5, a top view of the device 10 is illustrated. The detail referenced with B in FIG. 5 is illustrated in an enlarged manner in FIG. 6. The coupling arrangement 20 is illustrated in a partial cross-section in FIGS. 5 and 6. The center axis 30 of the rod assembly element 22 lies in the sectional plane so that a longitudinal section of a portion of the rod assembly element 22 is shown. The specific structure and the mode of operation of the coupling arrangement 20 is explained in further detail in the following in connection with FIGS. 7 to 23 with reference to several embodiments.

Figure 6:
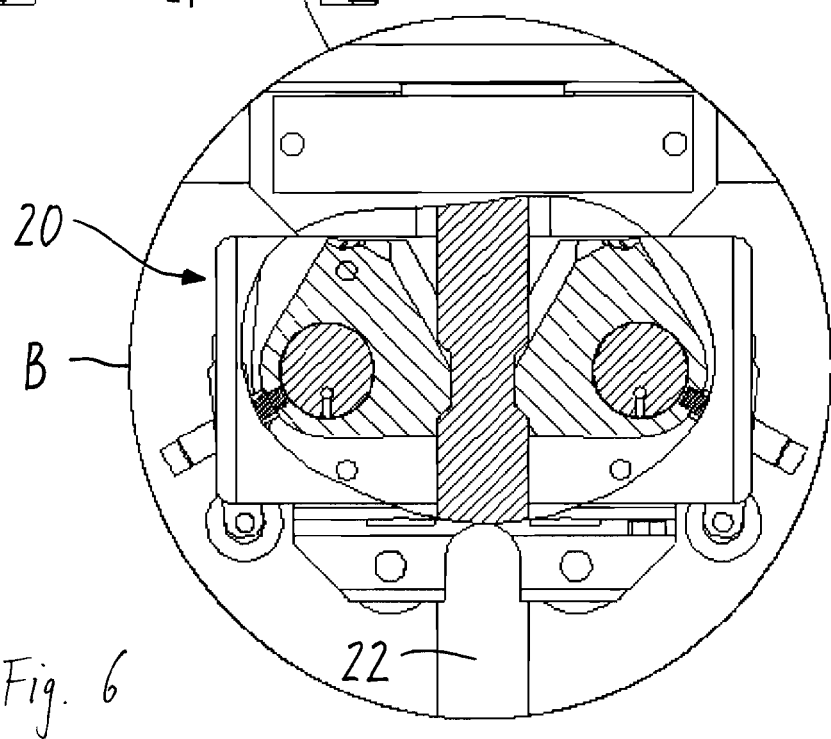
FIG. 6 shows an enlarged illustration of a detail B according to FIG. 5, with an illustration in partial cross-section of a coupling arrangement for establishing a drive connection between a push-pull unit of the device and the rod assembly.
Figure 7:
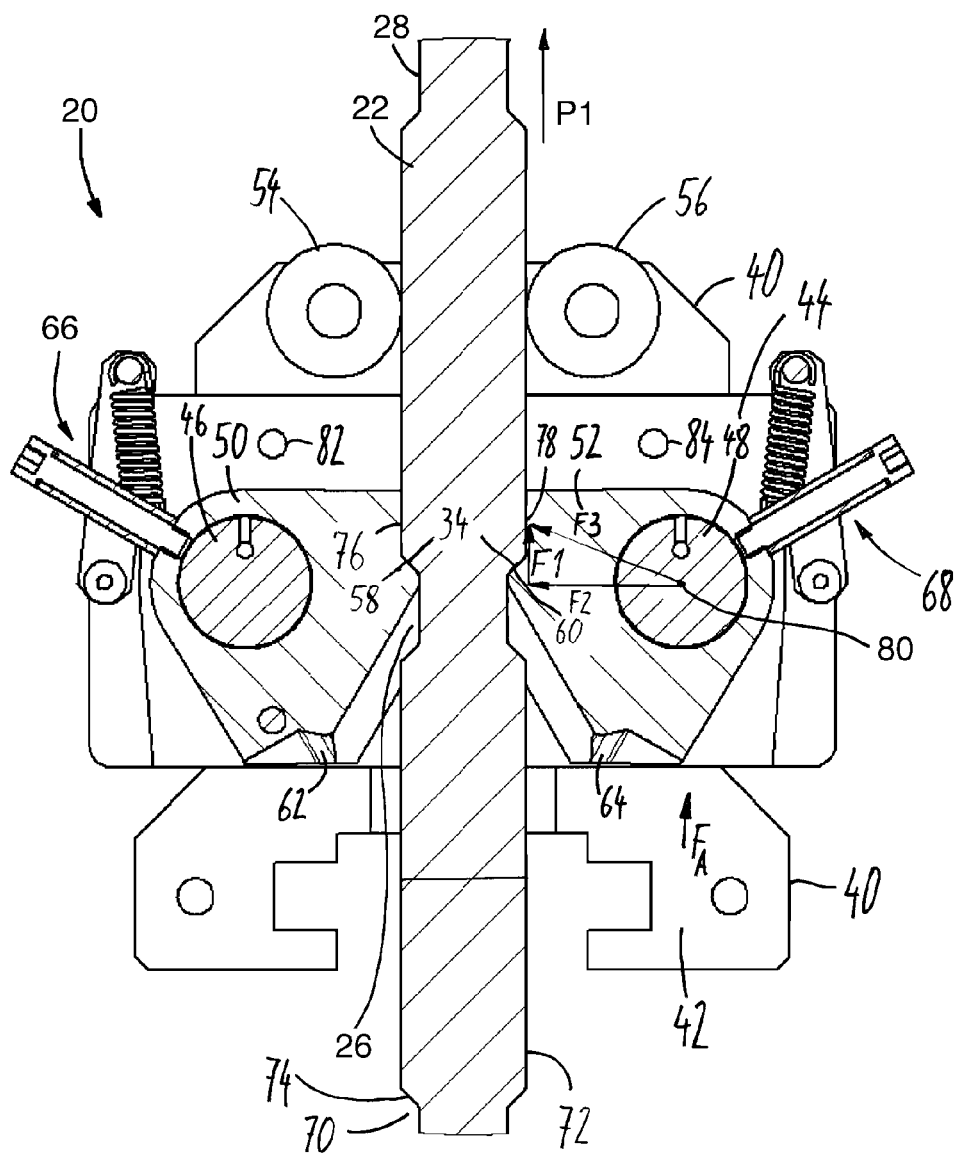
FIG. 7 shows a coupling arrangement according to a first embodiment of the invention in an illustration in cross-section, with a presetting of the coupling jaws for a movement of the rod assembly in a first drive direction.

FIG. 7 shows a coupling arrangement 20 according to a first embodiment of the invention, without the cover illustrated in FIGS. 5 and 6 in a partial cross-section. The coupling arrangement 20 has a basic element 40 which can be connected to the end of the piston rod of the working cylinder 18 via a connecting area 42, as illustrated in FIGS. 1, 2, 5 and 6. A guide plate 44 is firmly connected to the basic element 40, from which guide plate two journals 46, 48 project around which one coupling jaw 50, 52 each is pivotably mounted so that the journals 46, 48 define the axes of rotation of the coupling jaws 50, 52. The rod assembly element 22 is preferably rotationally symmetric and rests with its underside on the guide plate 44 in the area between the coupling jaws 50, 52. Two guide rolls 54, 56 are rotatably connected to the basic element 40 and contact the rod assembly element 22 on its circumferential surface so that the position of the rod assembly element 22 relative to the basic element 40 and thus to the guide plate 44 and the coupling jaws 50, 52 is defined. At least one of the guide rolls 54, 56 can be spring-loaded so that the roll 54, 56 is pressed against the circumferential surface of the rod assembly element 22.

The first coupling jaw 50 has a first engagement area 58 and a second engagement area 62. The second coupling jaw 52 has a first engagement area 60 and a second engagement area 64. In FIG. 7, each of the coupling jaws 50, 52 is preset via a lever-spring arrangement 66, 68 such that the coupling jaws 50, 52 are pressed with their first engagement areas 58, 60 into the recess 26 of the rod assembly element 22 so that the first engagement areas 58, 60 of the coupling jaws 50, 52 contact the flank 34 of the recess 26 due to a drive force $F_A$ exerted on the basic element 40 by the piston rod of the working cylinder 18. In the illustration according to FIG. 7, the first engagement areas 50, 60 already contact the flank 34 of the recess 26. After a respective feed of the rod assembly element 22 in the first drive direction indicated by the arrow P1 and after a retraction of the coupling arrangement 20, the coupling jaws 50, 52 snap fit into the recess 70 of a rod assembly element 72 connected to the rod assembly element 22 and contact the flank 74 of the recess 70.

When the first engagement areas 58, 60 of the coupling jaws 50, 52 contact the flank 34 of the recess, the drive force $F_A$ is introduced into the coupling jaws 50, 52 via the basic element 40, the guide plate 44 and the journals 46, 48. For the coupling jaw 52, a force triangle has been entered in FIG. 7, the force $F_1$ being half the drive force $F_A$ transmitted from the piston rod to the basic element 40, the force $F_2$ being the contact force caused by the engagement of the engagement area 60 of the coupling jaw 52, and the force $F_3$ being the force transmitted to the rod assembly element 22 and resulting from the contact force $F_2$ and the force $F_1$.

In the embodiment according to FIG. 7, the first engagement areas 58, 60 each form a first contact area, and the areas identified with the reference signs 76, 78 each form a second contact area. Via the second contact areas 76, 78 a contact force opposite to the force $F_2$ is exerted on the circumferential surface of the rod assembly element 22 contacted by the second contact areas 76, 78. Depending on the distance of the axis of rotation 80 of the coupling jaw 52 defined by the journal 48, the force ratio of drive force $F_A$ to contact force $F_2$ can be defined. Thus, also by a displacement of the axis of rotation 80 and of the axis of rotation defined by the journal 46, the force ratio between drive force $F_A$ and contact force can easily be set. In the guide plate 44 altogether four holes for receiving stop pins 82, 84 are provided. In two of these holes, stop pins 82, 84 are inserted which project from the guide plate 44 and limit the rotation of the coupling jaws 50, 52 about the journals 46, 48. As a result thereof, an unintended reversal of the drive direction of the coupling arrangement 20 is easily prevented.

Figure 8:
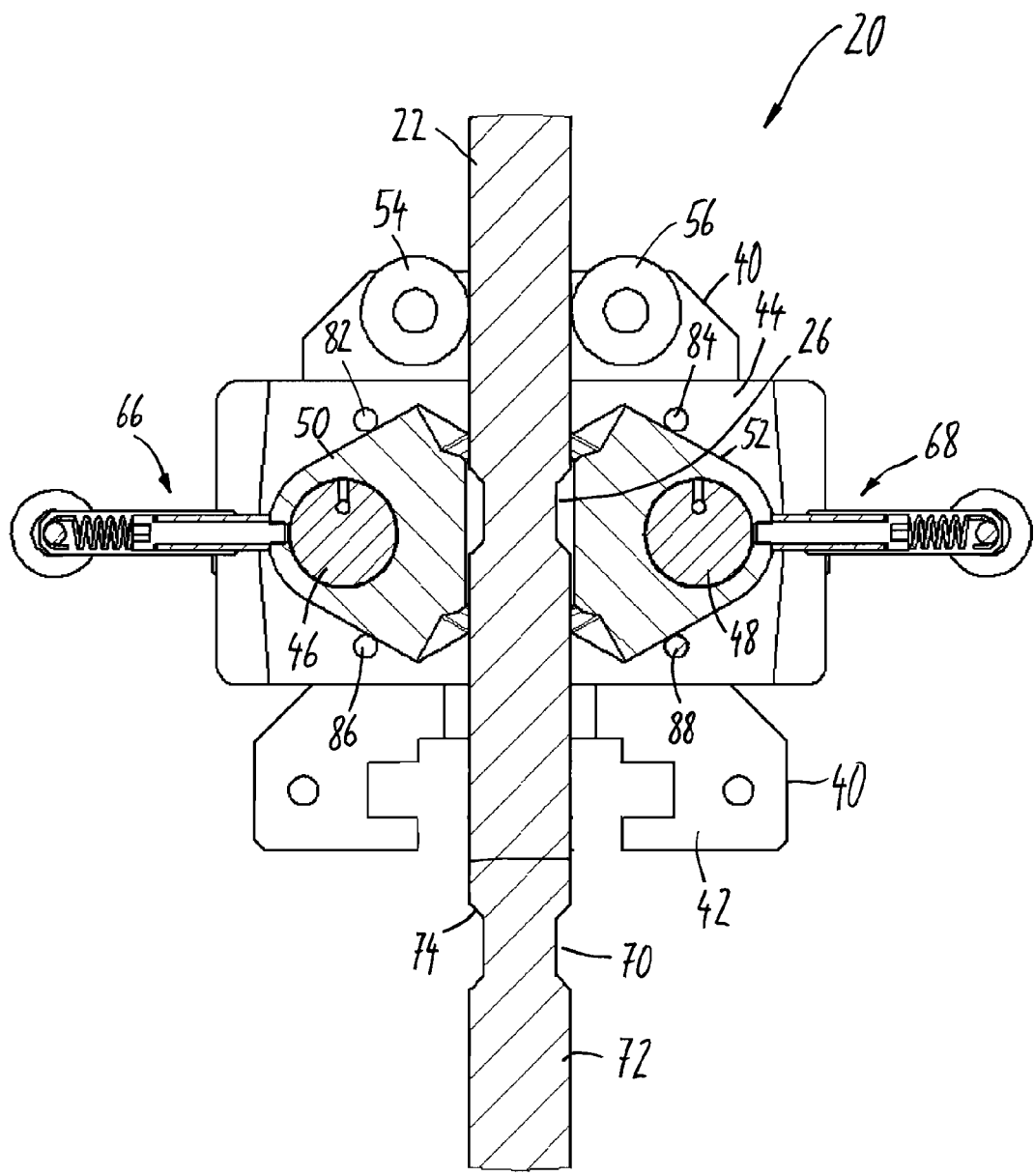
FIG. 8 shows the coupling arrangement according to FIG. 7, the coupling jaws of the coupling arrangement being arranged in a neutral position.

In FIG. 8, the coupling arrangement 20 of FIG. 7 according to the first embodiment of the invention is shown. In contrast to FIG. 7, the coupling jaws 50, 52 are illustrated in a neutral position, in which the coupling arrangement 20 is not engaged with the rod assembly element 22, and the rod assembly element 22 can thus be moved freely relative to the coupling arrangement 20. In this neutral position, in particular the first rod assembly elements 22 can be inserted into the device. In order to hold the coupling jaws 50, 52 in this position, four stop pins 82 to 88 are inserted in the holes in the guide plate 44 already mentioned in connection with FIG. 7, which stop pins substantially prevent a rotation of the coupling jaws 50, 52 about the journals 46, 48. During retraction of the coupling arrangement relative to the rod assembly element 22, the coupling jaws 50, 52 are still biased by the spring-lever arrangements 66, 68 and, when the coupling arrangement 20 is retracted opposite to the first drive direction P1, they are pushed out of the recess 26 via the flank 36 of the recess 26 opposite to the flank 34 so that each time only the edge of the first engagement area facing the rod assembly element 22 is pressed against the circumferential surface of the rod assembly element 22 by the spring force of the spring-lever arrangement 66, 68. In this process, the coupling jaws 50, approximately have the neutral position illustrated in FIG. 8. By the biasing of the spring-lever arrangements 66, 68, the coupling jaws 50, 52 are then pressed into the next recess 70 upon a further movement opposite to the first drive direction P1. When the drive direction of the working cylinder is subsequently reversed, the first engagement areas 58, 60 of the coupling jaws 50, 52 are pressed against the flank 74 of the recess 70 which is parallel to the flank 34.

Figure 9:
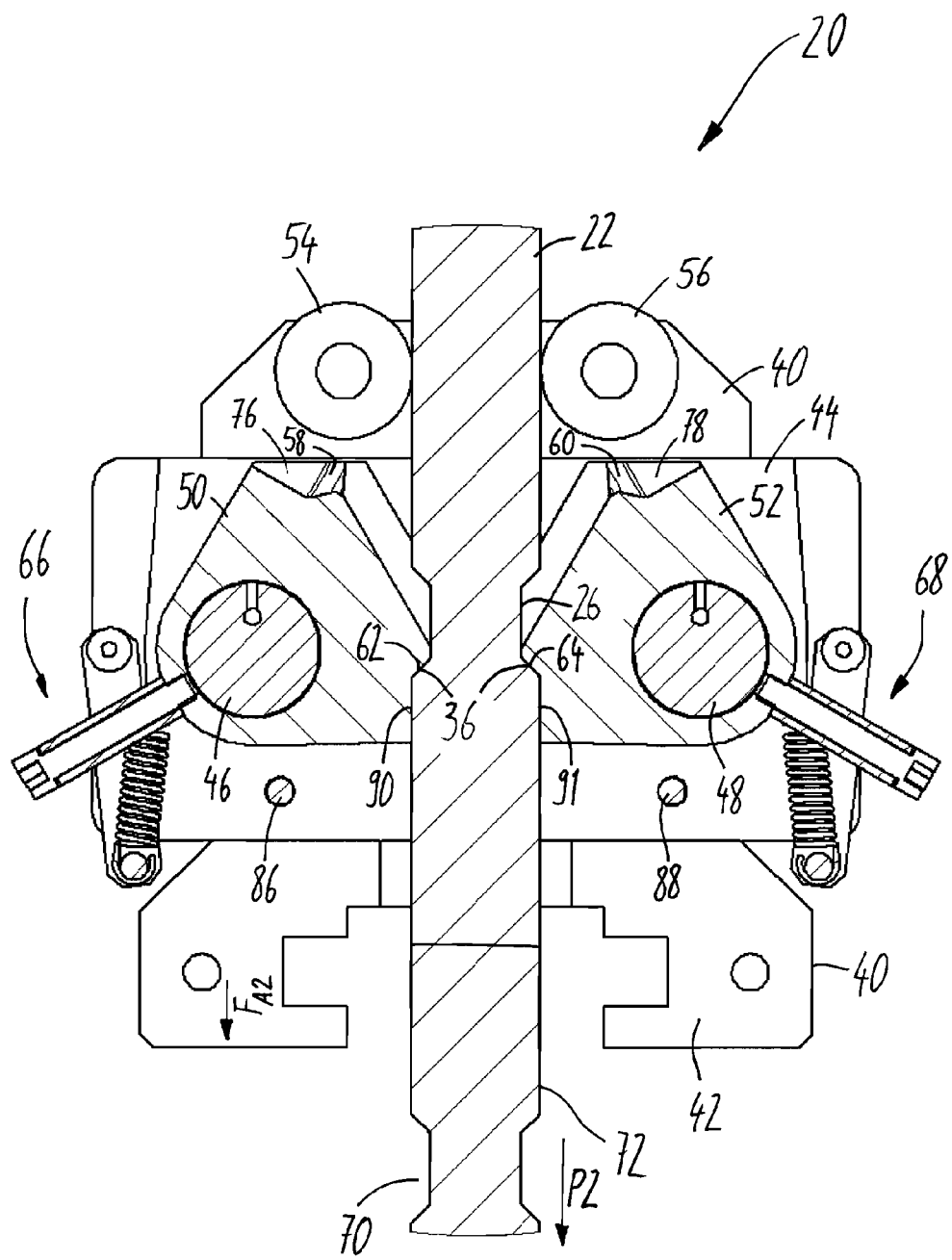
FIG. 9 shows the coupling arrangement according to FIGS. 7 and 8, with a presetting of the coupling jaws for a movement of the rod assembly in a second drive direction opposite to the first drive direction.

In FIG. 9, the coupling arrangement 20 according to the first embodiment according to FIGS. 7 and 8 is shown. Via the spring-lever arrangements 66, 68 the coupling arrangement 20 is preset such that the second engagement areas 62, 64 of the coupling jaws 50, 52 are brought into contact with the flank 36 of the recess 26 opposite to the flank 34, as a result whereof, given a drive force $F_{A2}$ caused by the working cylinder 18, a movement of the rod assembly elements 22, 70 in a second drive direction P2 is caused. Both the engagement of the second engagement areas 62, 64 as well as the creation of the contact force via contact areas 90, 91 take place in the same manner as described for the first drive direction P1.

With the aid of the working cylinder 18 a back and forth movement of the coupling arrangement 20 is created both in the preset first drive direction P1 as well as in the preset second drive direction P2, wherein by means of the reversal of the coupling jaws 50, 52 with the aid of the spring-lever arrangements 66, 68, the direction is preset in which the rod assembly element 22 is clamped by the coupling jaws 50, 52 and in which the rod assembly element 22 is movable freely relative to the coupling arrangement or, respectively, in which the coupling arrangement 20 is movable freely relative to the rod assembly element 22.

Figure 10:
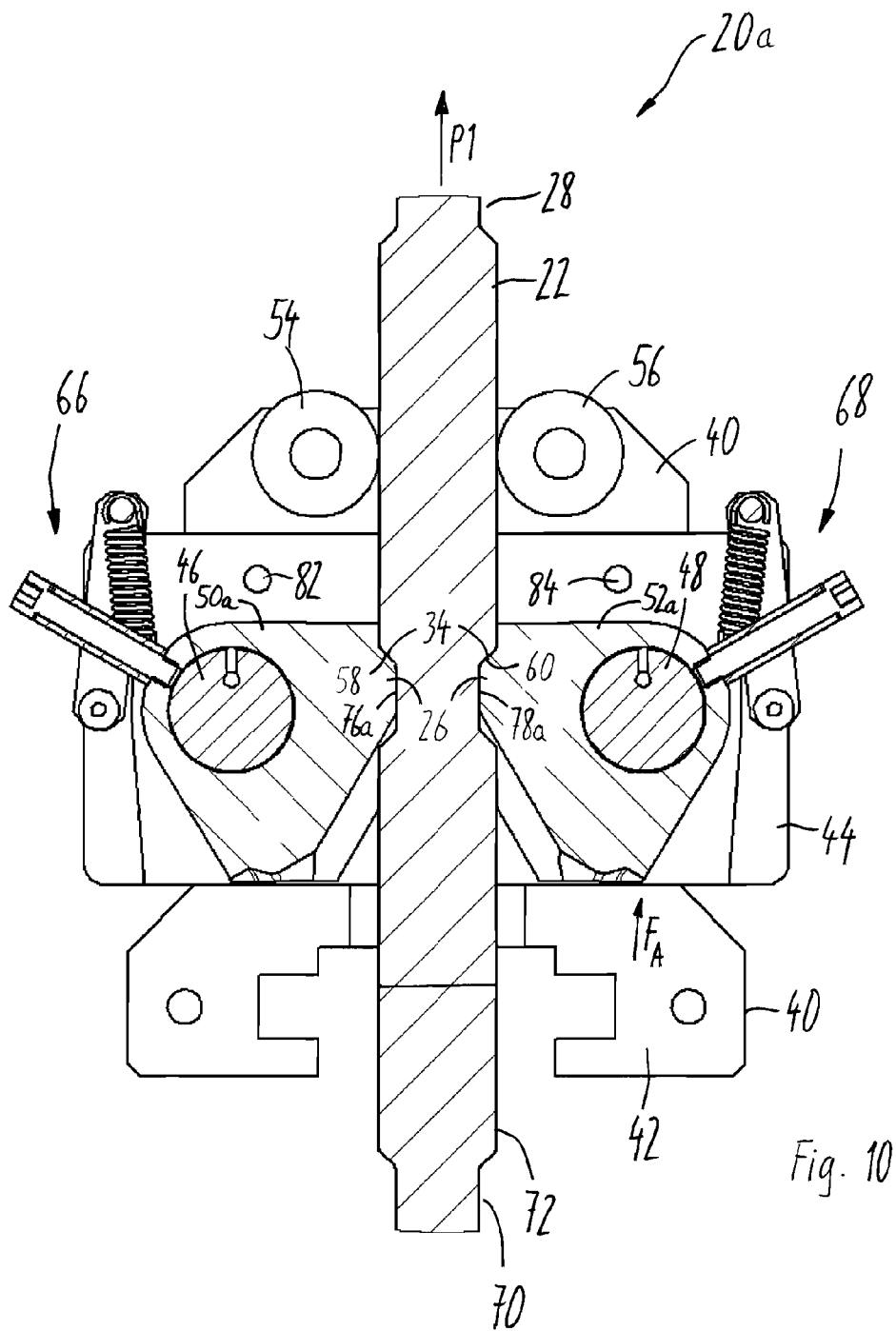
FIG. 10 shows a coupling arrangement according to a second embodiment of the invention in an illustration in cross-section, with a presetting of the coupling jaws for a movement of the rod assembly in a first drive direction.

In FIG. 10, a coupling arrangement 20a according to a second embodiment of the invention is illustrated. The constructive elements of the coupling arrangement 20a which are identical with those of the first embodiment are identified with identical reference signs. Different elements having an equal function are identified with the reference numeral of the first embodiment according to FIGS. 7 to 9 and additionally with a small letter a to e dependent on the further embodiment.

In the coupling arrangement 20a according to FIG. 10, the coupling jaws 50a, 52a are preset with the aid of the spring-lever arrangements 66, 68 for driving the rod assembly element 22 in the first drive direction P1. In contrast to the coupling jaws 50, 52, the coupling jaws 50a, 52a have second contact areas 76a, 78a which exert a contact force on the recess bottom when the respective coupling jaw 50a, 52a is rotated about the respective journal 46, 48 by the contact of the first engagement area 58, 60.

Figure 11:
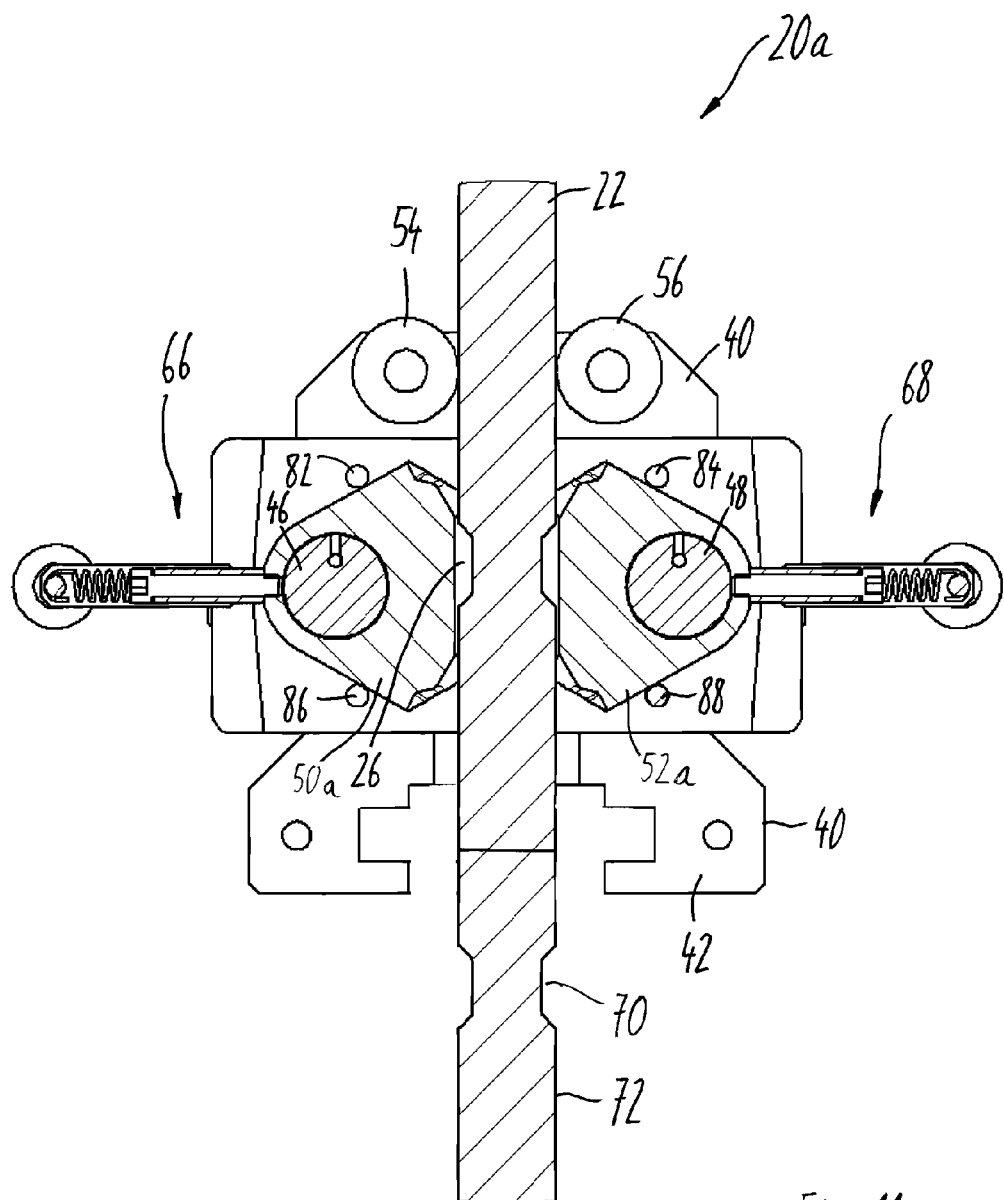
FIG. 11 shows the coupling arrangement according to FIG. 10, the coupling jaws being arranged in a neutral position.
Figure 12:
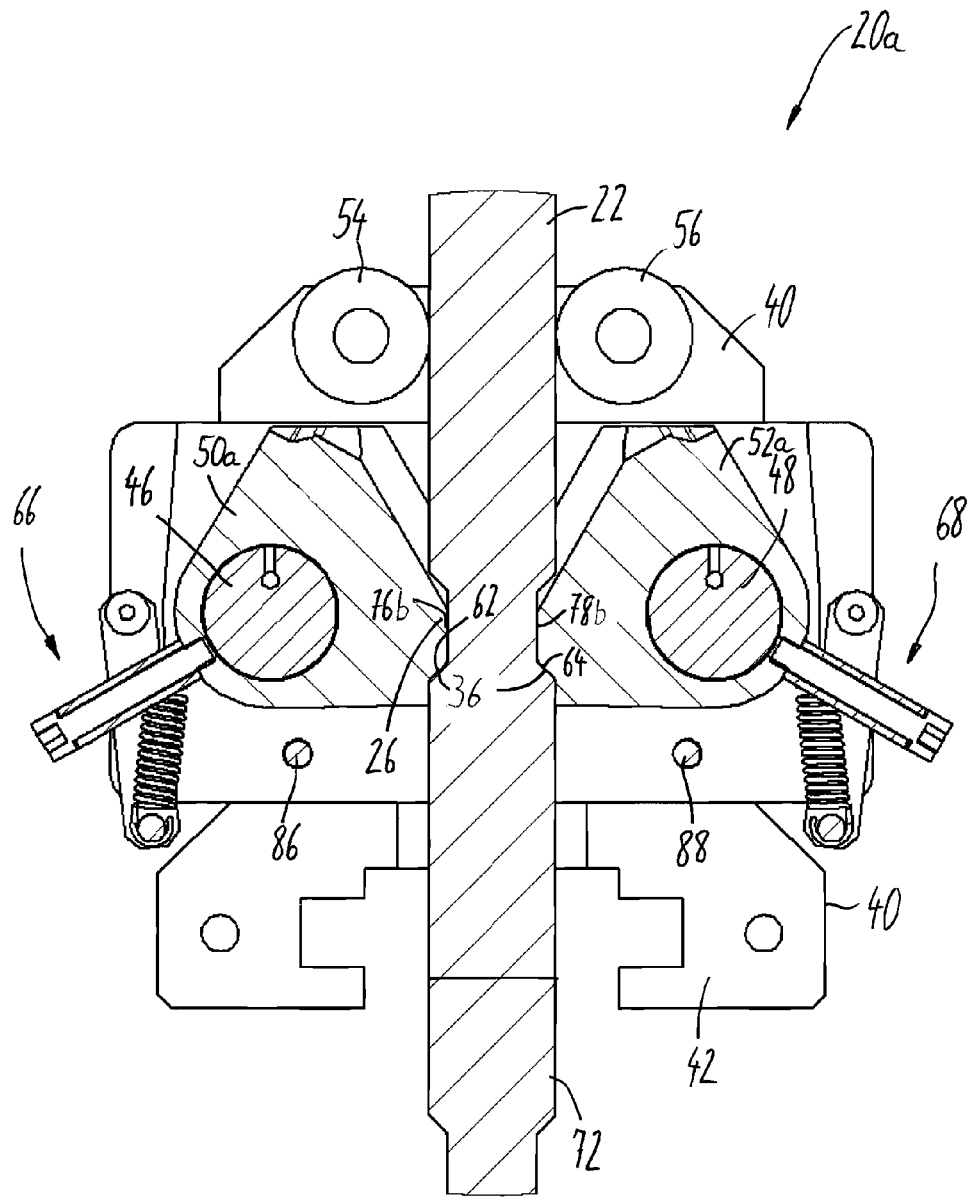
FIG. 12 shows the coupling arrangement according to FIGS. 10 and 11, with a presetting of the coupling jaws for a movement of the rod assembly in a second drive direction opposite to the first drive direction.

In FIG. 11, the coupling arrangement 20a is illustrated with a neutral position of the coupling jaws 50a, 52a. In FIG. 12, the coupling arrangement 20a is illustrated with a presetting of the coupling jaws 50a, 52a for moving the rod assembly elements 22, 70 in the drive direction P2.

In the first embodiment according to FIGS. 7 to 9 and in the second embodiment according to FIGS. 10 to 12, the engagement areas 58 to 62 each form a contact area for surface contact with the flank 34 of the recess 26. In the engagement position of the coupling jaws 50, 50a, 52, 52a, at least surface areas of the respective engagement area 58, 60 are oriented parallel to the surface areas of the flank 34. The flank 34 preferably has an angle of intersection relative to the center axis 30 of the rod assembly element 22 of 45°. In the engagement position, the first engagement areas 58, 60 have the same angle of intersection with the longitudinal axis of the rod assembly element 22 of 45°. In the following embodiments which are explained in connection with FIGS. 13 to 16, the engagement areas 58, 60 in the engagement position of the coupling jaws 50, 50a, 52, 52a and the flank 34 have different angles of intersection with the center axis 30. As a result thereof, the respective coupling jaw 50b to 50d contacts the flank 34 only in a contact area that is smaller than the engagement areas 58, 60. Preferably, the contact area is formed by a contact line only.

Figure 13:
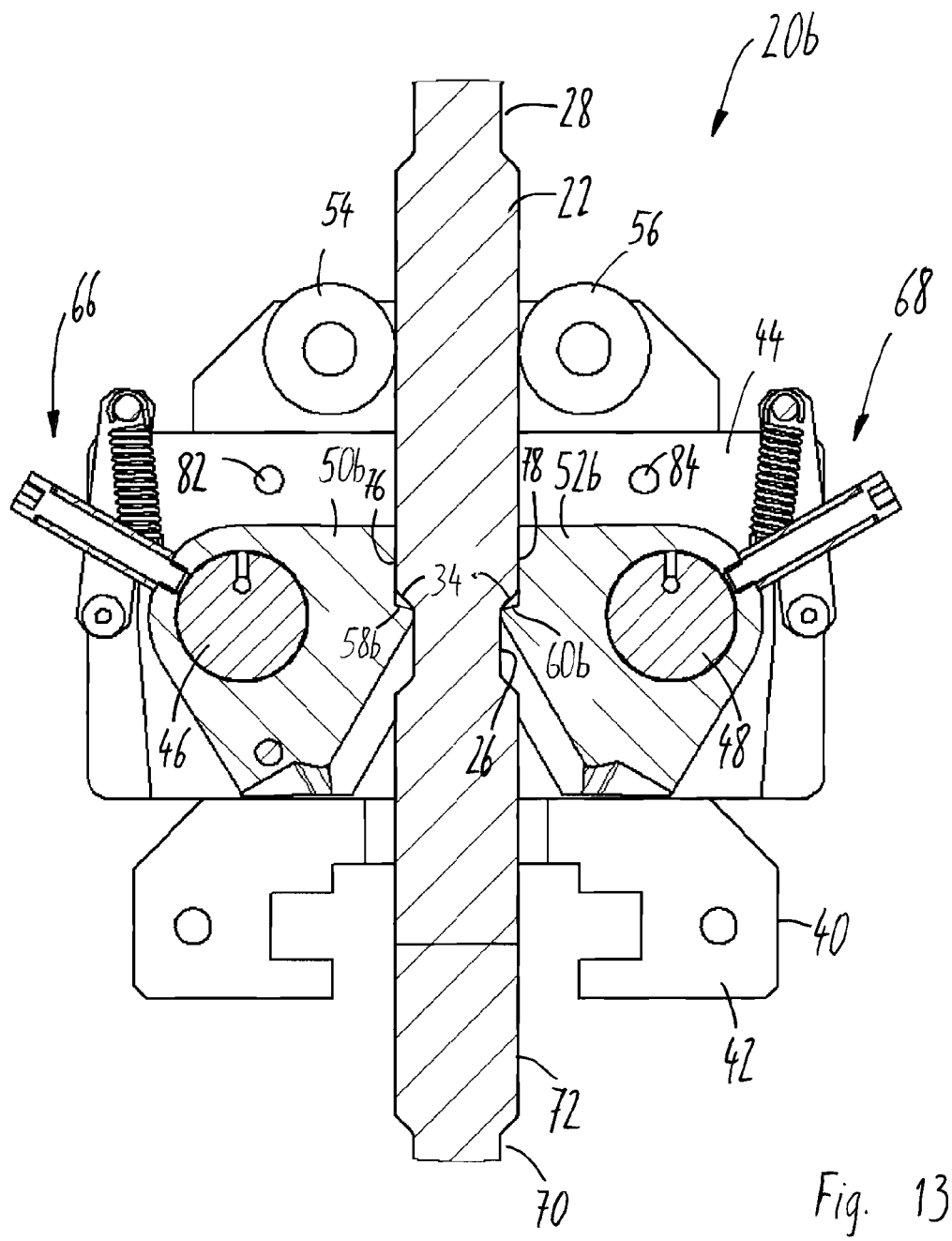
FIG. 13 shows a coupling arrangement according to a third embodiment of the invention in an illustration in cross-section, with a presetting of the coupling jaws for a movement of the rod assembly in a first drive direction.

In the coupling arrangement 20b according to the third embodiment of the invention according to FIG. 13, the angle of intersection of the engagement area with the center axis 30 of the rod assembly element 22 is greater than the angle of intersection of the flank 34 with the center axis 30. As a result thereof, the contact area of the engagement area 58b, 60b is arranged near or at the recess bottom of the recess 26. In the coupling arrangement 20b according to the fourth embodiment of the invention, thus a first feed force is transmitted via this relatively small contact area of the engagement areas 58b and 60b to the rod assembly element 22, and thus a rotation of the coupling jaws 50b, 52b is caused. In the same manner as explained in connection with the first embodiment according to FIGS. 7 to 9, thus a contact force is exerted in the contact areas 76, 78 by the coupling jaws 50b, 52b on the rod assembly element 22.

Figure 14:
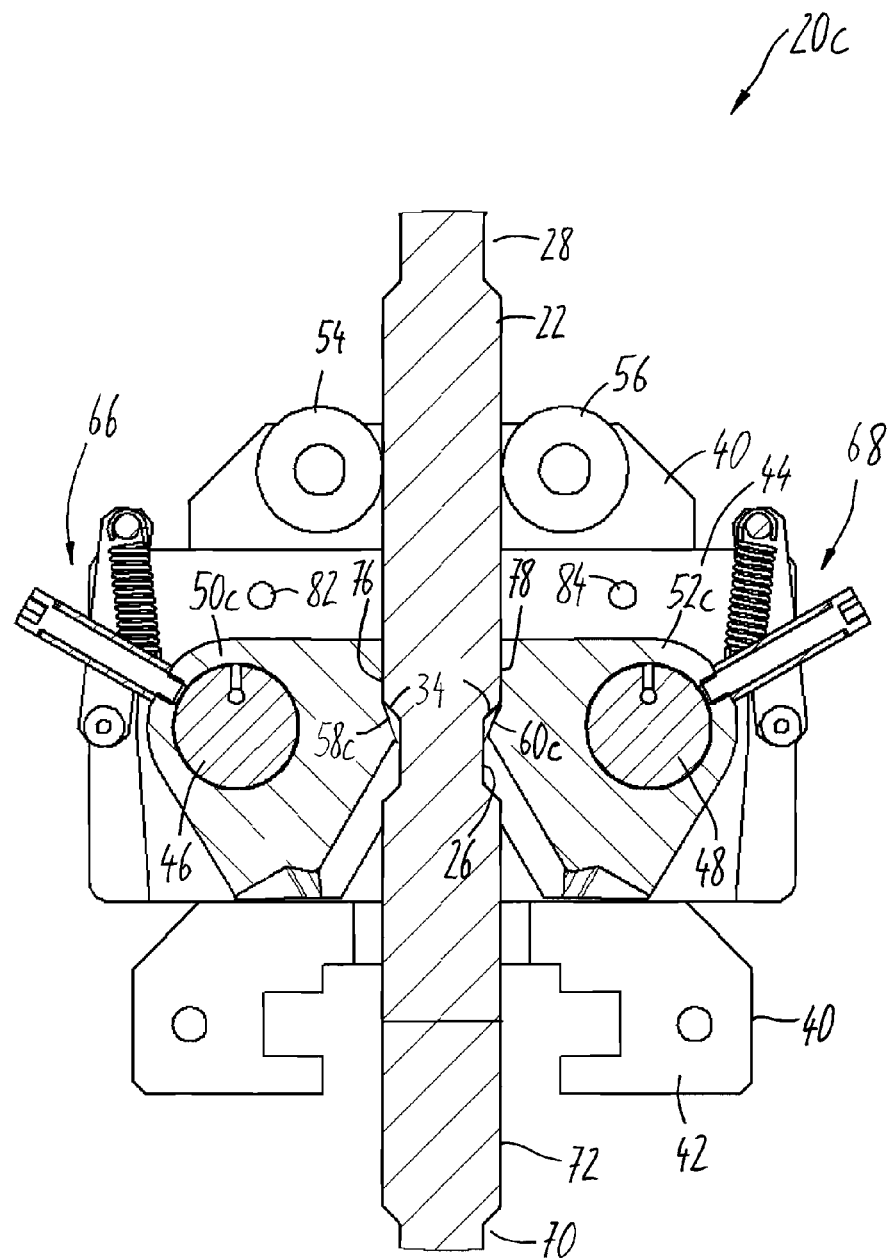
FIG. 14 shows a coupling arrangement according to a fourth embodiment of the invention in an illustration in cross-section, with a presetting of the coupling jaws for a movement of the rod assembly in a first drive direction.

In FIG. 14, a coupling arrangement 20c according to a fourth embodiment of the invention is shown, in which the coupling jaws 50c and 52c are preset for a movement of the rod assembly in the first drive direction P1. In the coupling arrangement 20c according to FIG. 14, the angle of intersection of the engagement area 58c, 60c with the center axis 30 of the rod assembly element 22 is smaller than the angle of intersection of the flank 34 with the center axis 30 of the rod assembly element 22. As a result thereof, the contact area of the engagement area 58c, 60c is arranged near the outer circumference of the rod assembly element and the recess 26. In the coupling arrangement 20c according to the fourth embodiment of the invention thus a first feed force is transmitted via this contact area of the engagement areas 58c and 60c to the rod assembly element 22, and thus a rotation of the coupling jaws 50c, 52c is caused. In the same manner as explained in connection with the first embodiment according to FIGS. 7 to 9, thus a contact force is exerted in the contact areas 76, 78 by the coupling jaws 50c, 52c on the rod assembly element 22.

Figure 15:
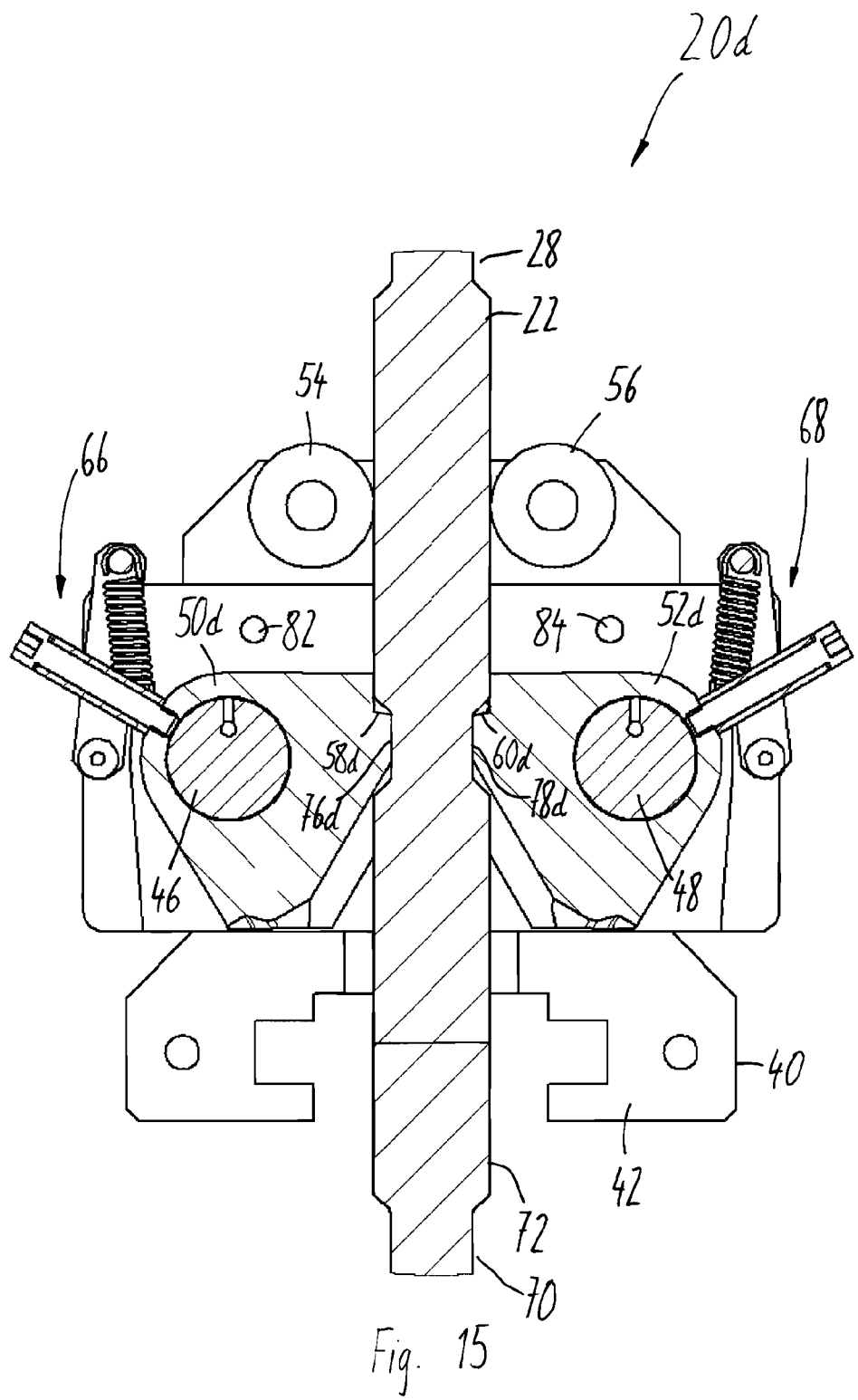
FIG. 15 shows a coupling arrangement according to a fifth embodiment of the invention in an illustration in cross-section, with a presetting of the coupling jaws for a movement of the rod assembly in a first drive direction.

In FIG. 15, a coupling arrangement 20d according to a fifth embodiment of the invention is shown, in which the coupling jaws 50d and 52d are preset for a movement of the rod assembly in the first drive direction P1. In the coupling arrangement 20d according to FIG. 15 the angle of intersection of the engagement area 58d, 60d with the center axis 30 of the rod assembly element 22 is greater than the angle of intersection of the flank 34 with the center axis 30. As a result thereof, the contact area of the engagement area 58d, 60d is arranged near the recess bottom of the recess 26. In the coupling arrangement 20c according to the fifth embodiment of the invention thus a first feed force is transmitted via this contact area of the engagement areas 58d and 60d to the rod assembly element 22, and thus a rotation of the coupling jaws 50d, 52d is caused so that, in the same manner as described in connection with the second embodiment according to FIGS. 10 to 12, a contact force is exerted in the contact areas 76d, 78d by the coupling jaws 50d, 52d on the rod assembly element 22 in the recess 26.

Figure 16:
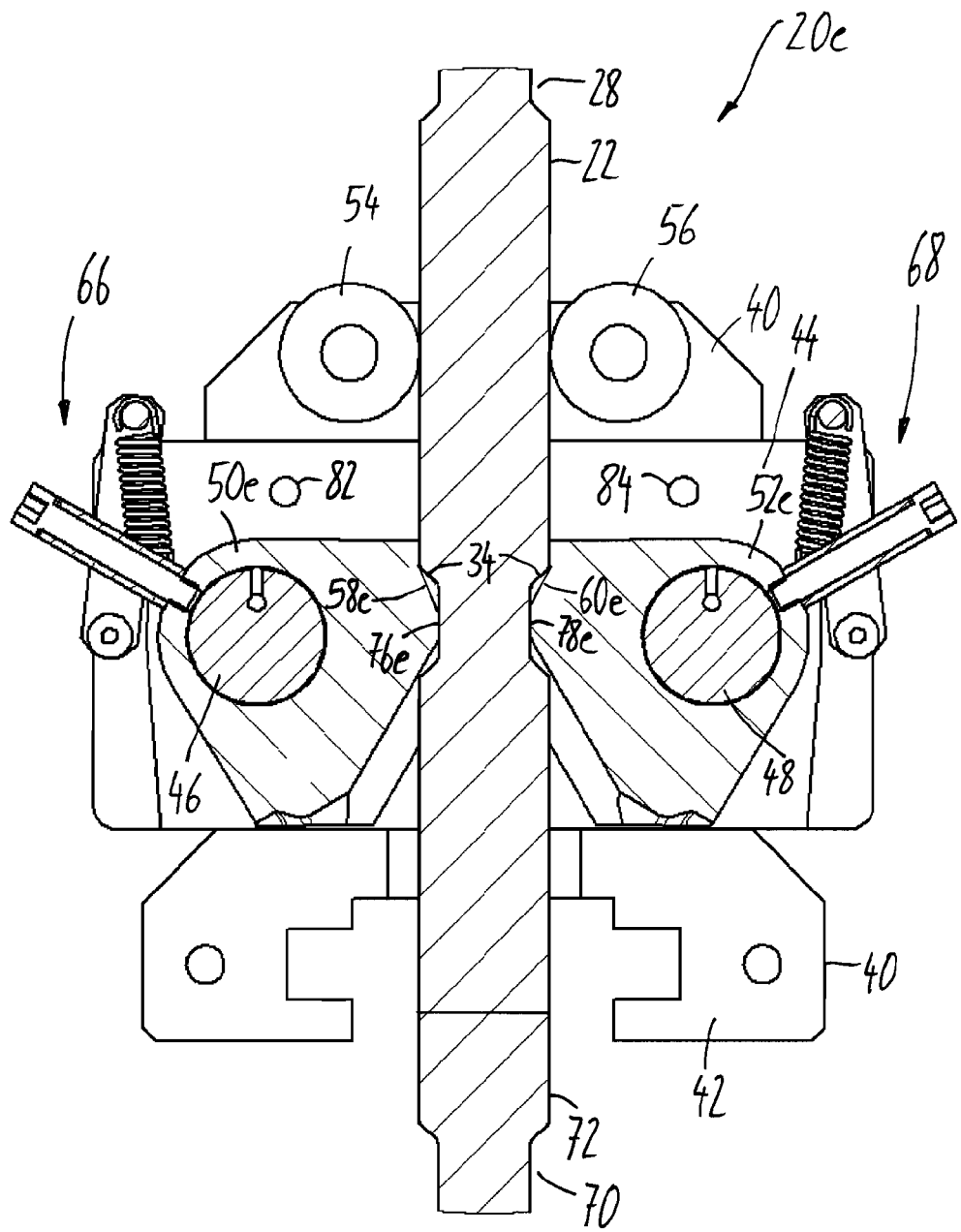
FIG. 16 shows a coupling arrangement according to a sixth embodiment of the invention in an illustration in cross-section, with a presetting of the coupling jaws for a movement of the rod assembly in a first drive direction.

In FIG. 16, a coupling arrangement 20e according to a sixth embodiment of the invention is shown, in which the coupling jaws 50e and 52e are preset for a movement of the rod assembly in the first drive direction P1. In the coupling arrangement 20e according to FIG. 16, the angle of intersection of the engagement area 58e, 60e with the center axis 30 of the rod assembly element 22 is smaller than the angle of intersection of the flank 34 with the center axis 30. As a result thereof, the contact area of the engagement area 58e, 60e is arranged near the outer circumference of the rod assembly element 22 at the edge of the recess 26. In the coupling arrangement 20e according to the sixth embodiment of the invention thus a first feed force is transmitted via this contact area of the engagement areas 58e and 60e to the rod assembly element 22, and thus a rotation of the coupling jaws 50e, 52e is caused so that, in the same manner as described in connection with the first embodiment according to FIGS. 7 to 9, a contact force is exerted in the contact areas 76e, 78e by the coupling jaws 50c, 52c on the rod assembly element 22.

Figure 17:
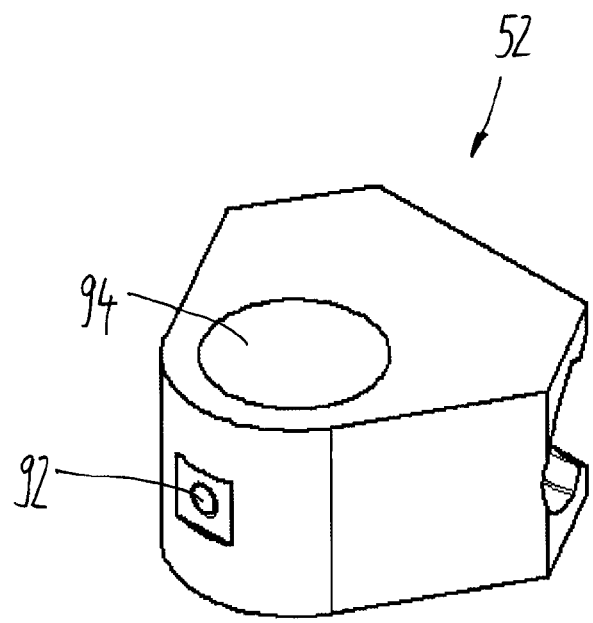
FIG. 17 shows a perspective view of a coupling jaw according to the first embodiment of the invention.
Figure 18:
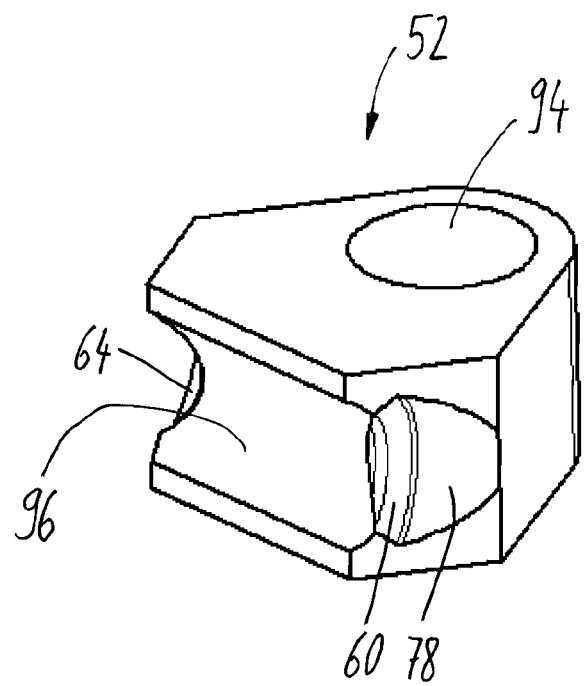
FIG. 18 shows a second perspective view of the coupling jaw according to FIG. 17.

In FIG. 17, a first perspective illustration and in FIG. 18 a second perspective illustration of the coupling jaw 52 according to the first embodiment of the invention is illustrated. The spring-lever arrangement 68 is connected to the coupling jaw 52 via a mounting point 92. The journal 48 is inserted into an opening 94. The first engagement area 60 contacts the flank 34 of the rod assembly element 22 over an angle range of about 90°. The contact area 78 is angled with respect to the engagement area 60 by 45° so that a straight line extending on the surface of the engagement area 60 intersects with a straight line extending on the surface of the contact area 78 in an angle of intersection of 45°. The area 96 lies opposite to the rod assembly element 22 in the neutral position according to FIG. 8.

Figure 19:
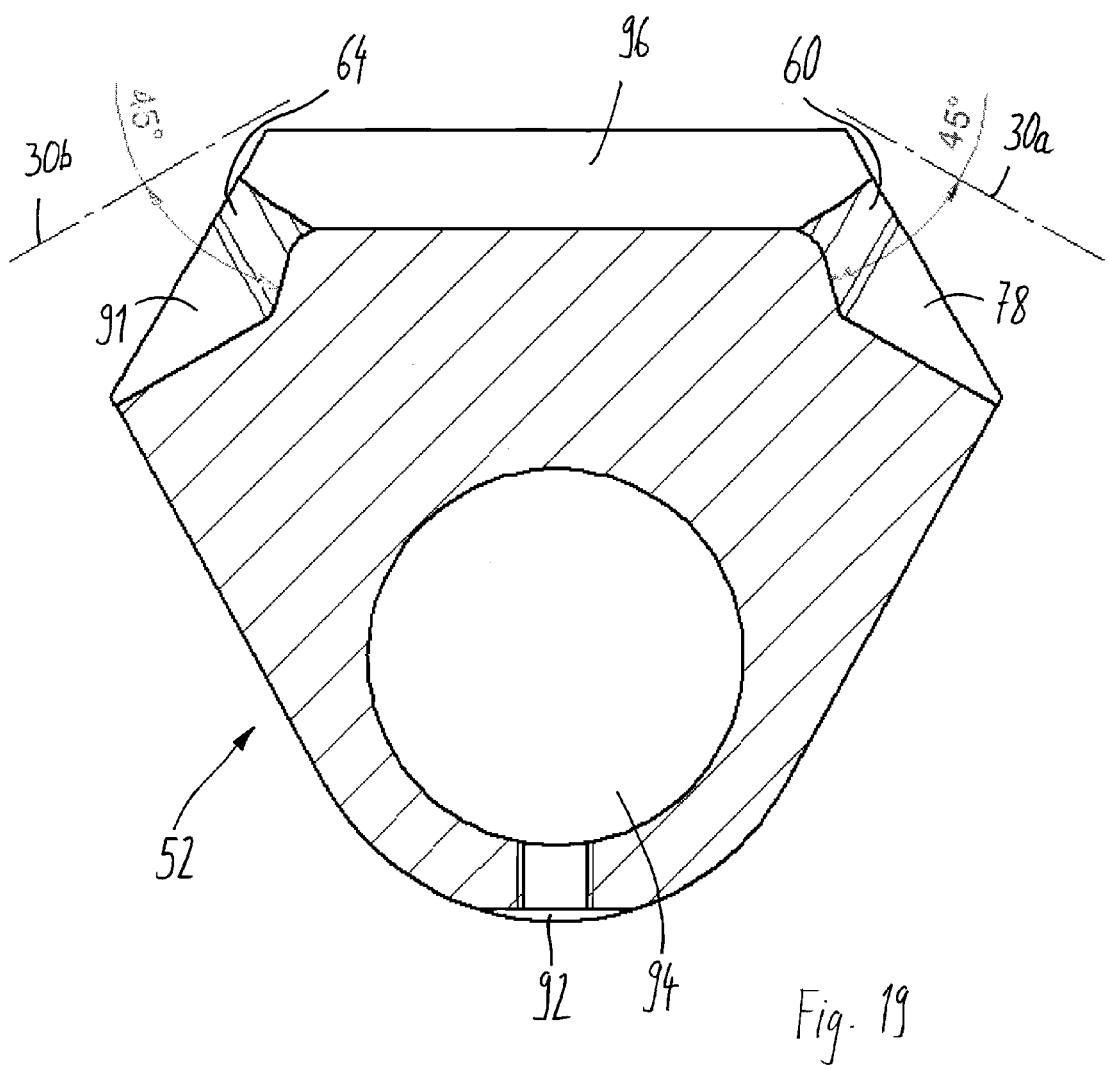
FIG. 19 shows an illustration in cross-section of the coupling jaw according to FIGS. 17 and 18.

FIG. 19 shows a longitudinal section of the coupling jaw 52. The dash-dot line 30a indicates the run of the center axis 30 of the rod assembly element 22 given a first position of the coupling jaw 52 according to FIG. 7, and the dash-dot line 30b indicates the position of the center axis 30 of the rod assembly element 22 given a second position of the coupling jaw 52 according to FIG. 9. The angle of intersection between the center axis 30 indicated by the dash-dot lines 30a, 30b and the respective engagement area 60, 64 is 45°.

Figure 20:
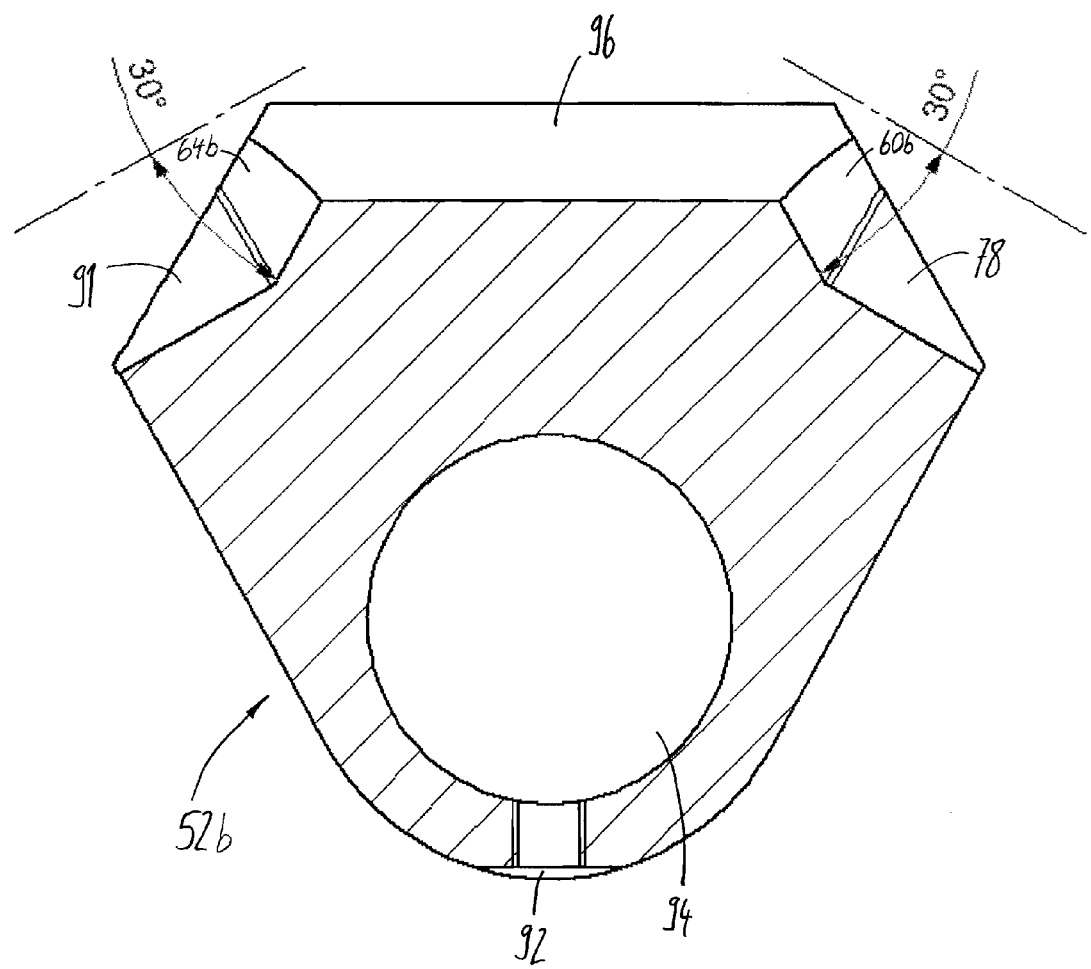
FIG. 20 shows an illustration in cross-section of a first coupling jaw according to the third embodiment of the invention.

FIG. 20 shows an illustration in cross-section of a first coupling jaw 52b according to the third embodiment of the invention. The angle of intersection between the center axis 30 indicated by the dash-dot lines 30a, 30b and the respective engagement area 60b, 64b is 30°.

Figure 21:
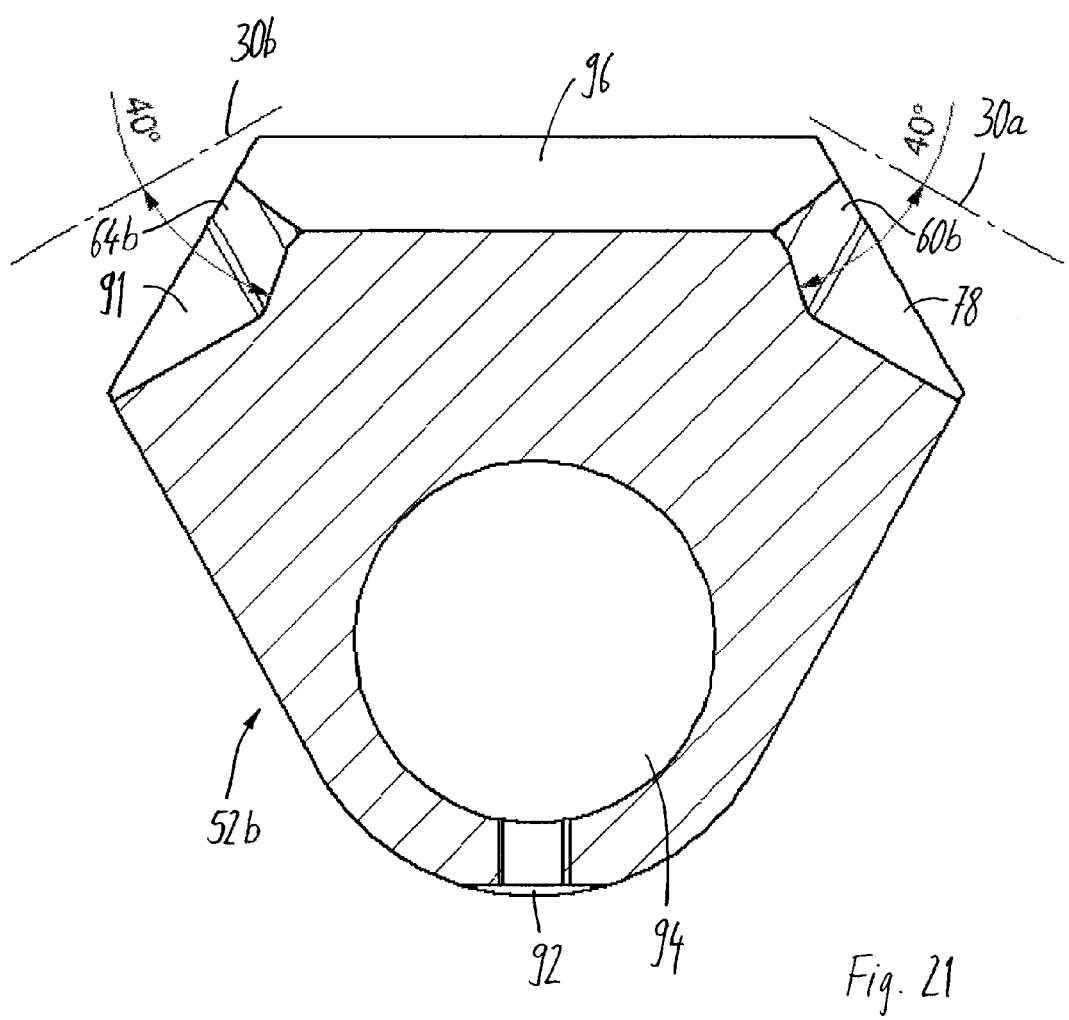
FIG. 21 shows an illustration in cross-section of a second coupling jaw according to an embodiment of the invention that is alternative to the third embodiment.

FIG. 21 shows an illustration in cross-section of an alternative second coupling jaw 52b according to the third embodiment of the invention. In this alternative second coupling jaw 52b the angles of intersection $\alpha$ are 40° each.

Figure 22:
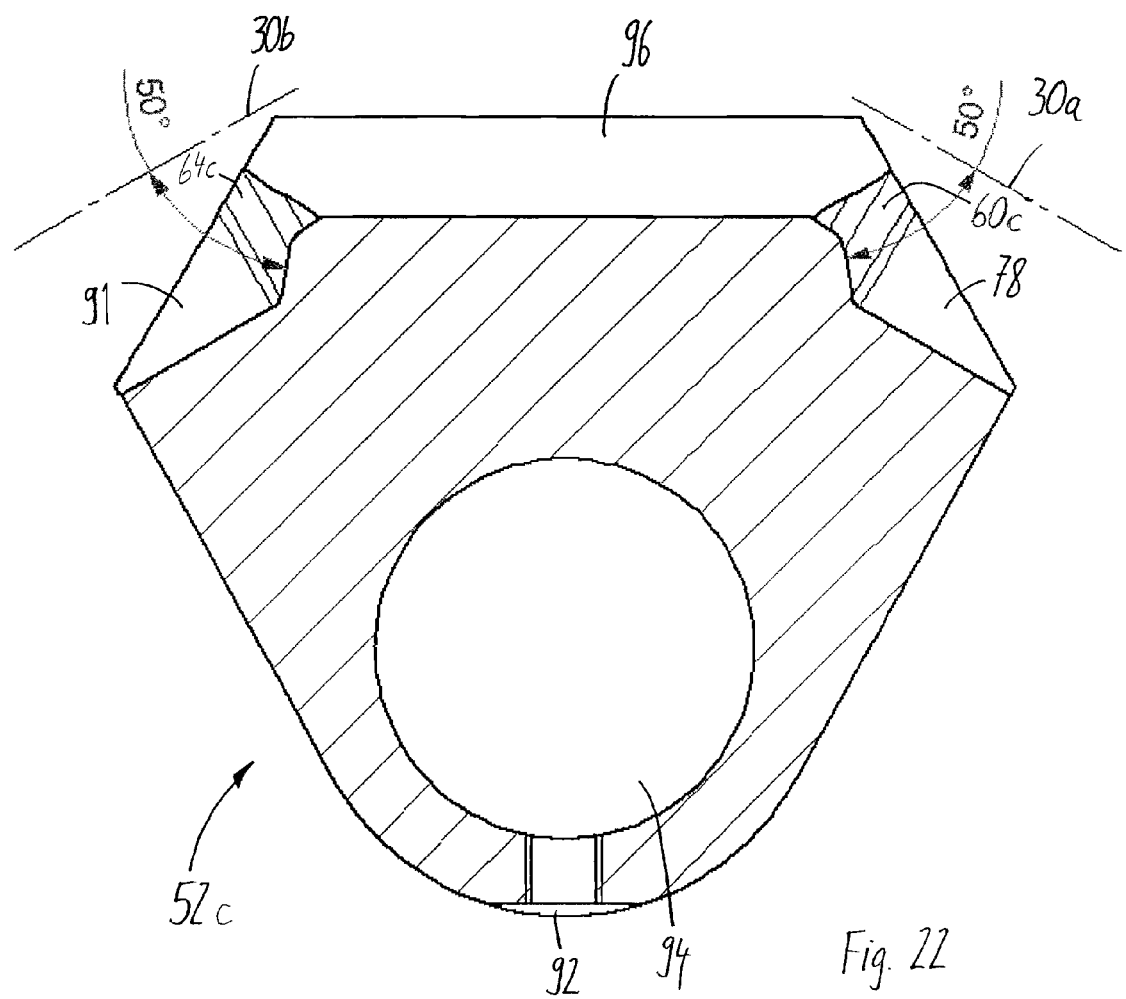
FIG. 22 shows an illustration in cross-section of a first coupling jaw of the fourth embodiment of the invention.

FIG. 22 shows an illustration in cross-section of a first coupling jaw 52c of the fourth embodiment of the invention. The angle of intersection between the center axis indicated by the dash-dot lines 30a, 30b and the respective engagement area 60c, 64c is 50°.

Figure 23:
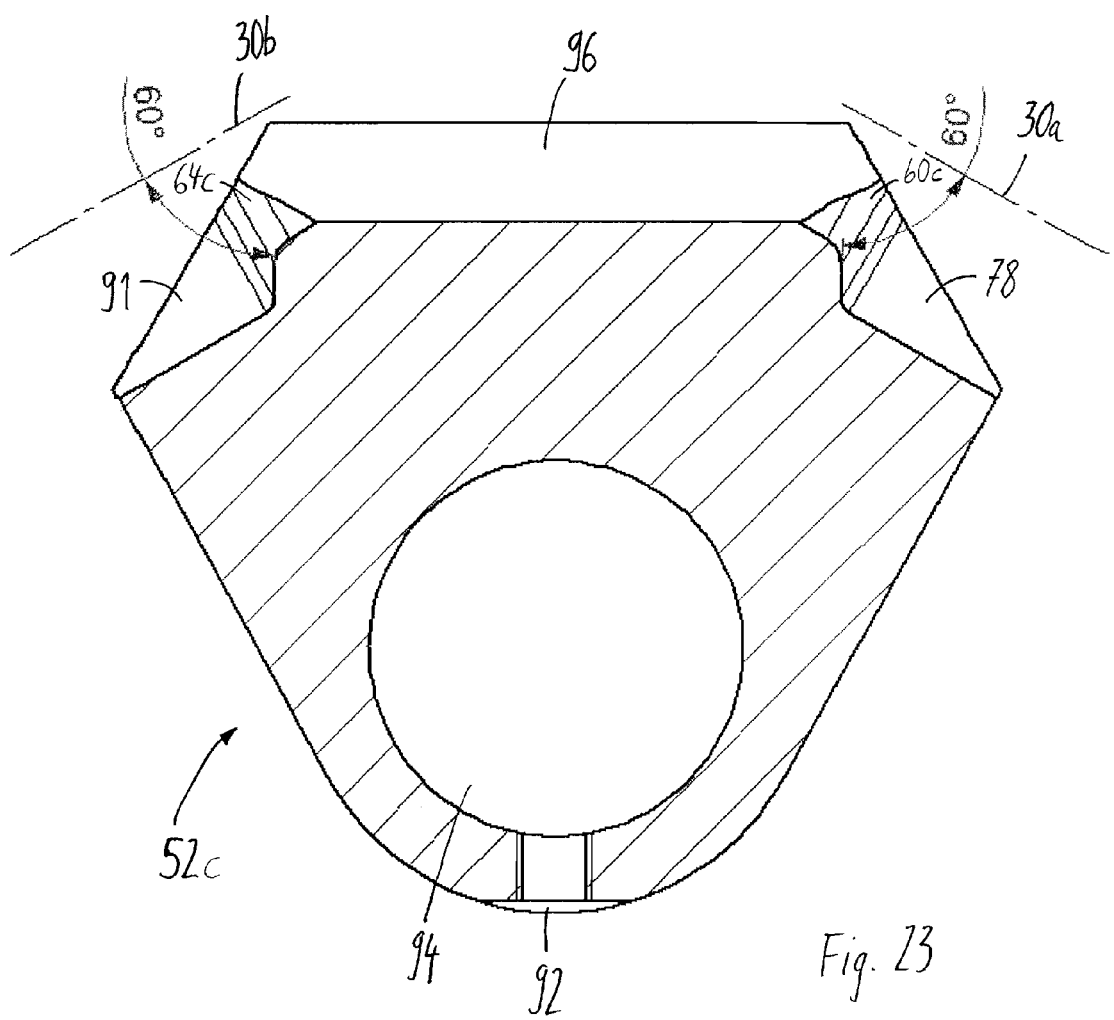
FIG. 23 shows an illustration in cross-section of a second coupling jaw according to an embodiment of the invention that is alternative to the fourth embodiment.

FIG. 23 shows an illustration in cross-section of an alternative second coupling jaw 52c according to the fourth embodiment of the invention. In this alternative second coupling jaw 52c, the angles of intersection $\alpha$ are 60° each.

Different from the rod assembly elements 22, 72 shown in the embodiments, these can also be formed as a rack and pinion gear, as rod assembly elements having engagement elements arranged in the form of a ladder and/or as a link chain, and can be connectable with one another positively or non-positively so that a shear-resistant rod assembly assembled from rod assembly elements can be formed.

Further, in the invention at least one contact area 76, 78 for contacting the circumferential surface of the rod assembly 22 can be arranged outside of the recess 26, 28, 70 and/or not in the area of the projection as well as a second contact area 76a, 78a for contacting the rod assembly 22 can be arranged in the area of the recess 26, 28, 70 and/or in the area of the projection. By this measure, the coupling means 50, 50a to 50e, 52, 52a to 52e can be pressed against the rod assembly 22, 72 at several contact areas 76, 76a, 76a', 78, 78a, 78a'. Further, it is advantageous in the inventive device 10 and the inventive method when the contact force with which the second contact area 76, 76a, 76a', 78, 78a, 78a' is pressed against the rod assembly 22 is greater than the weight of the coupling means 50, 50a to 50e, 52, 52a to 52e. As a result thereof, it is possible to actually establish a non-positive connection between the coupling element 50, 50a to 50e, 52, 52a to 52e and the rod assembly 22, 72 and to keep the size of the coupling means 50, 50a to 50e, 52, 52a to 52e relatively small.

LIST OF REFERENCE SIGNS 10 device
12 frame
14 front panel
16 push-pull unit
18 working cylinder
20, 20a to 20e coupling arrangement
22, 72 rod assembly element
24 coupling area
26,28,70 recess
30 center axis
30a, 30b positions of the center axis 30
32,34,74 flank
36 symmetry plane of the recess 26
40 basic element
42 connecting area
44 guide plate
46, 48 journal
50,50a,50b,50c,50d,50e first coupling jaw
52,52a,52b,52c,52d,52e second coupling jaw
54, 56 guide rolls
58, 60 first engagement area 62, 64 second engagement area
66, 68 spring-lever arrangement
76,76a,76a',78,78a, 78a',90,91 contact area
80 axis of rotation
82, 84, 86, 88 stop pin
92 mounting point
94 opening
$F_A$, $F_{A2}$, $F_1$, $F_2$, $F_3$ forces
P1 first drive direction
P2 second drive direction

The invention claimed is:

1. A device for moving a working means in the ground, comprising
a rod assembly having at least one projection or recess,
a push-pull unit for generating a linear movement of the rod assembly,
at least one coupling means rotatable about an axis of rotation for establishing a drive connection between the push-pull unit and the rod assembly,
wherein the coupling means is configured to engage the at least one projection or recess of the rod assembly such that the coupling means transmits a first feed force from the push-pull unit to the rod assembly via a first contact area of the coupling means,
wherein the coupling means is configured to engage the at least one projection or recess of the rod assembly such that the coupling means transmits a counter force opposite to the first feed force from the push-pull unit to the rod assembly via a second contact area of the coupling means,
wherein the counter force opposite to the first feed force generates a torque acting on the coupling means, which torque presses the second contact area of the coupling means with a contact force against the rod assembly,
wherein the coupling means establishes a non-positive connection between the push-pull unit and the rod assembly by the contact force and transmits a second feed force to the rod assembly via this non-positive connection, and
wherein at least a part of the first and second feed force acting on the rod assembly causes the linear movement of the rod assembly.

2. The device according to claim 1, characterized in that the push-pull unit is pressure-medium actuated and comprises at least one working cylinder and a piston having a piston rod, and in that the piston rod or the working cylinder is connected to a coupling arrangement comprising the coupling means and moves the coupling arrangement relative to a frame of the device.

3. The device according to claim 2, characterized in that the working cylinder and the piston rod have a channel for the passage of the rod assembly.

4. The device according to claim 1, characterized in that the linear movement of the rod assembly generates a pulling motion or a pushing motion of a working means connected to an end region of the rod assembly.

5. The device according to claim 1, characterized in that a coupling arrangement comprising the coupling means is formed as an automatic coupling arrangement which clamps the rod assembly in one working direction of the push-pull unit and is movable freely relative to the rod assembly in the opposite direction.

6. The device according to claim 5, characterized in that the working direction of the coupling arrangement is reversible by a reversal of the coupling means.

7. The device according to claim 1, characterized in that the rod assembly has several recesses, each of which in the form of circumferential grooves or circumferential projections, the distance between two adjacent recesses or, respectively, projections being smaller or equal to the length of a linear movement which can be generated by the push-pull unit in one working step.

8. The device according to claim 1, characterized in that a flank of the projection or of the recess into which the coupling means engages via the first contact area is arranged perpendicularly to the longitudinal axis of the rod assembly or in an acute angle to the longitudinal axis of the rod assembly.

9. The device according to claim 8, characterized in that the recess or, respectively, the projection has a second flank opposite to the first flank, wherein the flanks are arranged mirror-symmetrically to a plane which is arranged orthogonally to the longitudinal axis of the rod assembly.

10. The device according to claim 8, characterized in that a straight line extending on the surface of the flank intersects the longitudinal axis in an angle of intersection (a) which has a value in the range between 25° and 65°, preferably in the range between 30° and 60°, in particular a value of 45°.

11. The device according to claim 7, characterized in that the coupling means has an engagement area for engagement with the at least one projection or recess, which engagement area comprises the first contact area, wherein the engagement area of the coupling means is complementary to the flank of the recess during transmission of the first feed force via the first contact area so that during engagement a surface contact between the first contact area and the flank of the at least one projection or recess is established.

12. The device according to claim 7, characterized in that the coupling means has an engagement area for engagement with the at least one projection or recess, which engagement area comprises the first contact area, wherein the engagement area and the flank of the projection or, respectively, the recess do not extend parallel.

13. The device according to claim 12, characterized in that a straight line extending on the surface of the flank intersects the longitudinal axis of the rod assembly in a first angle of intersection ($\alpha$), in that a straight line extending on the surface of the engagement area intersects the longitudinal axis of the rod assembly during transmission of the first feed force in a second angle of intersection, and in that the first angle of intersection ($\alpha$) is greater or smaller than the second angle of intersection.

14. The device according to claim 10, characterized in that the angle of intersection or the angles of intersection or, respectively, the first and the second angle of intersection are arranged in a plane which includes the longitudinal axis of the rod assembly and the normal vector of which runs parallel to the axis of rotation of the coupling means.

15. The device according to claim 1, characterized in that a coupling arrangement is provided which comprises at least two coupling means each of which rotatable about an axis of rotation for establishing a drive connection between the push-pull unit and the rod assembly, in that the coupling means can each be engaged with the at least one projection or recess of the rod assembly such that the respective coupling means each time transmits a first feed force of the push-pull unit to the rod assembly via a first contact area of the respective coupling means, and in that the counter force opposite to the first feed force generates a torque acting on the respective coupling means, by which torque a second contact area of the coupling means presses against the rod assembly with a contact force.

16. The device according to claim 15, characterized in that the coupling arrangement comprises two coupling means which engage with the same at least one projection or recess on two opposite sides of the rod assembly or with opposite projections or opposite recesses of the rod assembly.

17. The device according to claim 15, characterized in that the coupling arrangement comprises at least three coupling means which are arranged radially about the rod assembly, preferably at the same angular distance from each other, and which engage with the same at least one projection or recess or with one projection each or one recess each.

18. The device according to claim 1, characterized in that by the engagement of the coupling means a rotation of the coupling means about the axis of rotation takes place such that a second contact area of the coupling means is pressed against the rod assembly with a contact force.

19. A method for moving a working means in the ground, comprising:
 providing a rod assembly having at least one projection or recess,
 providing a push-pull unit for generating a linear movement of the rod assembly,
 providing a coupling means rotatable about an axis of rotation for establishing a drive connection between the push-pull unit and the rod assembly,
 engaging the coupling means with the at least one projection or recess of the rod assembly such that via a first contact area of the coupling means a first feed force is transmitted from the push-pull unit to the rod assembly,
 engaging the coupling means with the at least one projection or recess of the rod assembly such that via a second contact area of the coupling means a counter force opposite the first feed force is transmitted from the push-pull unit to the rod assembly,
 wherein the counter force opposite to the first feed force generates a torque acting on the coupling means, which torque presses the second contact area of the coupling means against the rod assembly with a contact force,
 wherein, by the contact force, a non-positive connection is established between the push-pull unit and the rod assembly, via this non-positive connection, a second feed force is transmitted onto the rod assembly, and
 wherein at least a part of the first and second feed force acting on the rod assembly cause a linear movement of the rod assembly.

* * * * *